(12) United States Patent
Marchetti

(10) Patent No.: US 12,050,068 B2
(45) Date of Patent: Jul. 30, 2024

(54) MULTI-STAGE WATER DISTRIBUTION SYSTEM FOR CROSS-FLOW EVAPORATIVE HEAT EXCHANGER

(71) Applicant: UNIFLAIR S.p.A., Conselve (IT)

(72) Inventor: Daniele Marchetti, Chioggia (IT)

(73) Assignee: UNIFLAIR S.p.A., Conselve (IT)

( * ) Notice: Subject to any disclaimer, the term of this patent is extended or adjusted under 35 U.S.C. 154(b) by 495 days.

(21) Appl. No.: 17/342,157

(22) Filed: Jun. 8, 2021

(65) Prior Publication Data
US 2022/0390188 A1  Dec. 8, 2022

(51) Int. Cl.
| | |
|---|---|
| F28F 7/02 | (2006.01) |
| F28D 5/02 | (2006.01) |
| F28D 9/00 | (2006.01) |
| F28F 25/02 | (2006.01) |
| F28F 25/06 | (2006.01) |
| F28F 27/00 | (2006.01) |
| F28F 25/00 | (2006.01) |

(52) U.S. Cl.
CPC ............ *F28F 7/02* (2013.01); *F28D 5/02* (2013.01); *F28D 9/0062* (2013.01); *F28F 25/02* (2013.01); *F28F 25/06* (2013.01); *F28F 27/00* (2013.01); *F25B 2339/041* (2013.01); *F28F 25/00* (2013.01)

(58) Field of Classification Search
CPC .... F28F 7/02; F28F 25/02; F28F 25/06; F28F 25/00; F28F 27/00; F28D 5/02; F28D 9/0062; F25B 2339/041
USPC ........................................................ 165/165
See application file for complete search history.

(56) References Cited

U.S. PATENT DOCUMENTS

| | | | |
|---|---|---|---|
| 4,685,308 A * | 8/1987 | Welker | F25B 39/04 62/305 |
| 5,180,103 A | 1/1993 | Harrison, Jr. et al. | |
| 10,876,748 B2 | 12/2020 | Rede et al. | |
| 2003/0145619 A1 | 8/2003 | Word | |
| 2009/0188650 A1 | 7/2009 | Morgan et al. | |
| 2012/0067546 A1 | 3/2012 | Bugler, III et al. | |
| 2014/0262163 A1 | 9/2014 | Deschamps | |
| 2014/0263765 A1 | 9/2014 | You et al. | |
| 2018/0283814 A1* | 10/2018 | Najafifard | F28B 1/02 |

(Continued)

FOREIGN PATENT DOCUMENTS

| | | |
|---|---|---|
| EP | 0957326 A2 | 11/1999 |
| EP | 0957326 B1 | 8/2004 |

OTHER PUBLICATIONS

Extended European Search Report from corresponding European Application No. 22177510.9 dated Nov. 3, 2022.

*Primary Examiner* — Joel M Attey
(74) *Attorney, Agent, or Firm* — Lando & Anastasi, LLP

(57) ABSTRACT

A heat exchange system includes a first heat exchanger subassembly, a second heat exchanger subassembly, a first nozzle configured to spray fluid at the first heat exchanger subassembly, and a second nozzle configured to spray fluid at the second heat exchanger subassembly. The heat exchange system further includes memory storing controller-executable instructions and a controller configured to execute the instructions, which cause the controller to activate the first nozzle when an outdoor temperature is below a threshold temperature, and activate the first nozzle and the second nozzle when the outdoor temperature is above the threshold temperature.

6 Claims, 20 Drawing Sheets

(56) References Cited

U.S. PATENT DOCUMENTS

2019/0017332 A1   1/2019  Loh et al.
2019/0017344 A1   1/2019  Lambert et al.
2019/0093961 A1*  3/2019  Kloeppner .............. F28F 25/02

* cited by examiner

| | 1 | 2 | 3 | 4 | TOT CC | CC VAR % r | WATER USAGE |
|---|---|---|---|---|---|---|---|
| | (dry) 46.1 | (dry) 49.9 | (dry) 98 | (dry) 48 | 242 | | 0% |
| | (dry) 39.3 | (dry) 41.7 | (dry) 83.8 | (dry) 41.2 | 206 | -15% | 0% |
| | (dry) 54.4 | (dry) 43.2 | (wet) 107.2 | (dry) 27.4 | 232.4 | -4% | 25% |
| | (dry) 39.4 | (dry) 54.3 | (dry) 84.1 | (wet) 67 | 244.8 | +1% | 25% |
| | (dry) 39.4 | (dry) 83.6 | (dry) 84.1 | (dry) 41.2 | 248.0 | +3% | 25% |
| | (dry) 52.8 | (dry) 55.2 | (wet) 107.8 | (wet) 52.5 | 268.3 | +10.8% | 50% |
| | (dry) 39.4 | (wet) 77.4 | (dry) 84 | (wet) 67 | 267.8 | +10.6% | 50% |
| | (wet) 84 | (wet) 65.3 | (wet) 107.8 | (wet) 52.5 | 309.3 | +27% | 100% |

FIG. 14

MULTI-STAGE WATER DISTRIBUTION SYSTEM FOR CROSS-FLOW EVAPORATIVE HEAT EXCHANGER

BACKGROUND OF DISCLOSURE

1. Field of Disclosure

The present disclosure relates generally to indirect evaporator cooler systems, and more particularly to a multi-stage water distribution system for a cross-flow evaporative heat exchanger.

2. Discussion of Related Art

Indirect air evaporative cooling systems typically use outdoor air to indirectly cool data center air when the outside temperature is lower than the temperature set point of the internet technology (IT) inlet air to the server, which can result in significant energy savings. Such systems use fans to move cold outside air across an air-to-air heat exchanger, which in turn cools the hot data center air on the inside of the heat exchanger, thereby completely isolating the data center air from the outside air. This heat removal method normally uses an evaporative assist, in which the outside surface of the air-to-air heat exchanger is sprayed with water, which allows the heat exchanger to continue its cooling operation for higher dry bulb ambient temperatures or to provide a more economical cooling operation of the hot data center air.

Using fresh air directly to cool a data center is often viewed as the most efficient cooling approach. For data centers experiencing a wide range of temperature and humidity conditions, this cooling approach is often the most efficient. However, the majority of data center managers are risk-averse to these higher operating temperatures and rapid changes in temperature and humidity. Nor do they wish to expose the data center to pollution or other contaminants that may be present in the direct air cooling process. With rising densities and the adoption of containment practices, it is undesirable to allow IT equipment to run at higher temperatures, especially if a failure event occurs. When temperature and humidity thresholds are kept within industry-recommended limits, indirect air economizers actually provide greater efficiency than direct fresh air.

One approach to cooling large spaces, such as data centers, is to utilize extremely large air-to-air heat exchanger units (AHUs) mounted to one or more external building faces or to the roof. Modern AHUs contain extremely large heat exchangers, mainly of the type of cross flow plate heat exchangers, but also bundle pipe type are used. With modern indirect evaporative cooling systems, hot IT air is pulled into an AHU, and one of two modes of economizer operation is used to eject the heat. Based on the load, the IT set point, and outdoor environmental conditions, the system automatically selects the most efficient mode of operation. The indirect air-to-air economization mode uses an air-to-air heat exchanger to transfer the heat energy from the hotter data center air to the colder outdoor air. When evaporative cooling is used, a thin water film is applied over the heat exchanging surfaces of the heat exchanger typically with a water spray system. By spraying water on the heat exchanger, the water can absorb the heat within the heat exchanger and evaporate it to the outdoor air adding moisture to the airstream. This mode of operation allows the data center to continue to benefit from economizer mode operation, even when the air-to-air heat exchanging process alone is unable to reject the data center heat load. Methods and systems for improving cooling efficiency in an indirect evaporative cooling system within a data center or other heat generating process are being explored.

SUMMARY OF DISCLOSURE

One aspect of the present disclosure is directed to a heat exchange system comprising a first heat exchanger subassembly, a second heat exchanger subassembly, a first nozzle configured to spray fluid at the first heat exchanger subassembly, and a second nozzle configured to spray fluid at the second heat exchanger subassembly. The heat exchange system further comprises memory storing controller-executable instructions and a controller configured to execute the instructions, which cause the controller to activate the first nozzle when an outdoor temperature is below a threshold temperature, and activate the first nozzle and the second nozzle when the outdoor temperature is above the threshold temperature.

Embodiments of the heat exchange system further may include configuring the controller to activate the at least one fan to move air over at least one of the first heat exchanger subassembly and the second heat exchanger subassembly when the outdoor temperature is below a second threshold temperature, the second threshold temperature being below a first threshold temperature. The controller further may be configured to deactivate the first nozzle when an outdoor temperature is below the second threshold temperature. The at least one fan may be positioned proximate the second heat exchanger subassembly, with air being configured to flow over the second heat exchanger subassembly and then over the first heat exchanger subassembly. The first heat exchanger subassembly may be positioned adjacent the second heat exchanger subassembly. The heat exchange system further may include a third heat exchanger subassembly positioned adjacent the first heat exchanger subassembly and a fourth heat exchanger subassembly positioned adjacent the second heat exchanger subassembly and the third heat exchanger subassembly. The first nozzle may be positioned between the second heat exchanger subassembly and the fourth heat exchanger subassembly and the second nozzle is positioned between the first heat exchanger subassembly and the third heat exchanger subassembly. The heat exchange system further may include at least one fan configured to move air over the second heat exchanger subassembly and the fourth heat exchanger subassembly. The threshold temperature may be a first threshold temperature, and the controller further may be configured to activate the at least one fan to move air over at least one of the second heat exchanger subassembly and the fourth heat exchanger subassembly when the outdoor temperature is below a second threshold temperature, the second threshold temperature being below the first threshold temperature. The controller further may be configured to deactivate the first nozzle when an outdoor temperature is below the second threshold temperature. The at least one fan may be positioned proximate the second heat exchanger subassembly and the fourth heat exchanger subassembly, with air being configured to flow over the second heat exchanger subassembly and the fourth heat exchanger subassembly and then over the first heat exchanger subassembly and the third heat exchanger subassembly.

Another aspect of the present disclosure is directed to one or more non-transitory machine-readable media storing instructions that, when executed by one or more processors, cause the one or more processors to activate a first nozzle configured to spray fluid at a first heat exchanger subassembly when an outdoor temperature is below a first threshold temperature, and activate the first nozzle and a second nozzle configured to spray fluid at a second heat exchanger subassembly when the outdoor temperature is above the first threshold temperature.

Embodiments of the one or more non-transitory machine-readable media further may include causing the one or more processors to activate at least one fan to move air over the first heat exchanger subassembly and the second heat exchanger subassembly when the outdoor temperature is below a second threshold temperature, the second threshold temperature being below the first threshold temperature. The one or more non-transitory machine-readable further may include storing instructions that, when executed by the one or more processors, cause the one or more processors to deactivate the first nozzle when an outdoor temperature is below the second threshold temperature. The at least one fan may be positioned proximate the second heat exchanger subassembly, with air being configured to flow over the second heat exchanger subassembly and then over the first heat exchanger subassembly. The first heat exchanger subassembly may be positioned adjacent the second heat exchanger subassembly. The one or more non-transitory machine-readable media further may include a third heat exchanger subassembly positioned adjacent the first heat exchanger subassembly and a fourth heat exchanger subassembly positioned adjacent the second heat exchanger subassembly and the third heat exchanger subassembly. The first nozzle may be positioned between the second heat exchanger subassembly and the fourth heat exchanger subassembly and the second nozzle is positioned between the first heat exchanger subassembly and the third heat exchanger subassembly. The one or more non-transitory machine-readable media further may include storing instructions that, when executed by the one or more processors, cause the one or more processors to activate at least one fan to move air over the second heat exchanger subassembly and the fourth heat exchanger subassembly. The one or more non-transitory machine-readable media further may include storing instructions that, when executed by the one or more processors, cause the one or more processors to activate the at least one fan to move air over at least one of the second heat exchanger subassembly and the fourth heat exchanger subassembly when the outdoor temperature is below a second threshold temperature, the second threshold temperature being below the first threshold temperature. The one or more non-transitory machine-readable media further may include storing instructions that, when executed by the one or more processors, cause the one or more processors to deactivate the first nozzle when an outdoor temperature is below the second threshold temperature. The at least one fan may be positioned proximate the second heat exchanger subassembly and the fourth heat exchanger subassembly, with air being configured to flow over the second heat exchanger subassembly and the fourth heat exchanger subassembly and then over the first heat exchanger subassembly and the third heat exchanger subassembly.

Another aspect of the present disclosure is directed to a method of cooling comprising: activating a first nozzle configured to spray fluid at a first heat exchanger subassembly when an outdoor temperature is below a first threshold temperature; and activating the first nozzle and a second nozzle configured to spray fluid at a second heat exchanger subassembly when the outdoor temperature is above the first threshold temperature.

Embodiments of the method further may include activating at least one fan to move air over the first heat exchanger subassembly and the second heat exchanger subassembly when the outdoor temperature is below a second threshold temperature, the second threshold temperature being below the first threshold temperature. The method further may include deactivating the first nozzle when an outdoor temperature is below the second threshold temperature. The at least one fan may be positioned proximate the second heat exchanger subassembly, with air being configured to flow over the second heat exchanger subassembly and then over the first heat exchanger subassembly. The first heat exchanger subassembly may be positioned adjacent the second heat exchanger subassembly. The method further may include a third heat exchanger subassembly positioned adjacent the first heat exchanger subassembly and a fourth heat exchanger subassembly positioned adjacent the second heat exchanger subassembly and the third heat exchanger subassembly. The first nozzle may be positioned between the second heat exchanger subassembly and the fourth heat exchanger subassembly and the second nozzle may be positioned between the first heat exchanger subassembly and the third heat exchanger subassembly. The method further may include activating at least one fan to move air over the second heat exchanger subassembly and the fourth heat exchanger subassembly. The method further may include activating the at least one fan to move air over at least one of the second heat exchanger subassembly and the fourth heat exchanger subassembly when the outdoor temperature is below a second threshold temperature, the second threshold temperature being below the first threshold temperature. The method further may include deactivating the first nozzle when an outdoor temperature is below the second threshold temperature. The at least one fan may be positioned proximate the second heat exchanger subassembly and the fourth heat exchanger subassembly, with air being configured to flow over the second heat exchanger subassembly and the fourth heat exchanger subassembly and then over the first heat exchanger subassembly and the third heat exchanger subassembly.

Yet another aspect of the present disclosure is directed to a method of assembling a heat exchanger comprising: providing a heat exchanger having two or more heat exchanger subassemblies that are positioned proximate one another; providing a first nozzle configured to spray fluid at a first heat exchanger subassembly and a second nozzle configured to spray fluid at a second heat exchanger subassembly; and providing a controller configured to activate the first nozzle to spray fluid at the first heat exchanger subassembly when an outdoor temperature is below a first threshold temperature and to activate the first nozzle and the second nozzle to spray fluid at a second heat exchanger subassembly when the outdoor temperature is above the first threshold temperature.

Embodiments of the method further may include providing at least one fan to move air over the first sub-heat exchanger and the second sub-heat exchanger. The controller further may be configured to activate the at least one fan to move air over the first sub-heat exchanger and the second sub-heat exchanger when the outdoor temperature is below a second threshold temperature. The second threshold temperature may be below the first threshold temperature. The controller further may be configured to deactivate the first nozzle when an outdoor temperature is below the second threshold temperature. The method further may include positioning the at least one fan proximate the second heat exchanger subassembly, air being configured to flow over the second heat exchanger subassembly and then over the first heat exchanger subassembly. The first heat exchanger subassembly may be positioned adjacent the second heat exchanger subassembly. The method further may include positioning a third sub-heat exchanger adjacent the first sub-heat exchanger and positioning a fourth sub-heat exchanger adjacent the second sub-heat exchanger and the third sub-heat exchanger. The method further may include positioning the first nozzle between the second sub-heat exchanger and the fourth sub-heat exchanger and positioning the second nozzle between the first sub-heat exchanger and the third sub-heat exchanger. The method further may include positioning the at least one fan proximate the second sub-heat exchanger and the fourth sub-heat exchanger, air being configured to flow over the second sub-heat exchanger and the fourth sub-heat exchanger and then over the first sub-heat exchanger and the third sub-heat exchanger. The controller further may be configured to activate the fan to move air over the second sub-heat exchanger and the fourth sub-heat exchanger and to activate the fan to move air over the second sub-heat exchanger and the fourth sub-heat exchanger when the outdoor temperature is below a second threshold temperature. The second threshold temperature may be below the first threshold temperature. The controller further may be configured to deactivate the first nozzle when an outdoor temperature is below the second threshold temperature.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 14 is a table summarizing the results shown in FIGS. 12A-12H;

DETAILED DESCRIPTION

Figure 1:
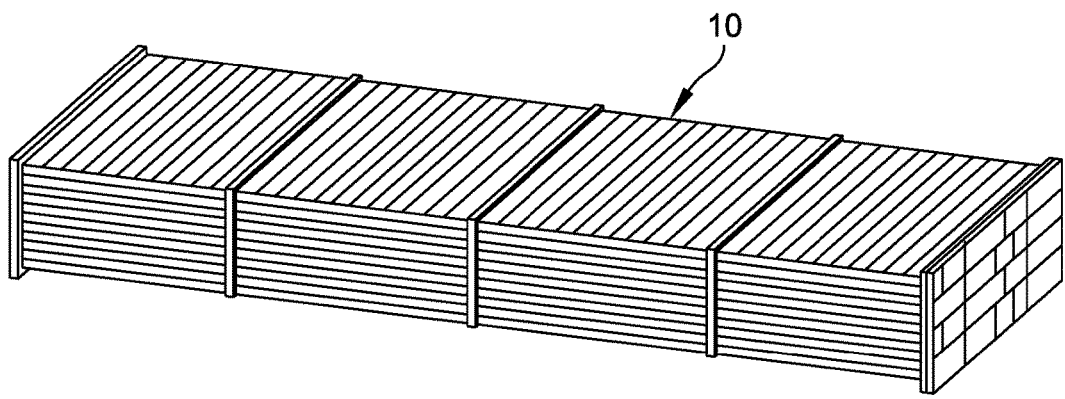
FIG. 1 is a perspective view of a heat exchanger.

This disclosure is not limited in its application to the details of construction and the arrangement of components set forth in the following description or illustrated in the drawings. The principles set forth in this disclosure are capable of being provided in other embodiments and of being practiced or of being carried out in various ways. Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. When specific dimensions, quantities or magnitudes are provided they should be considered in reference to the specific embodiment referenced as they may be scaled to suit other embodiments.

Embodiments of the present disclosure are directed to systems and methods of efficiently spraying evaporative cooling water on a heat exchanger. Many alternative cooling approaches have been developed and adopted over the last few years in an effort provide efficient heat removal from a variety of processes that generate heat, data centers being one example of these processes. One such method that has gained recent favor is indirect evaporative cooling. This method minimizes/eliminates the need for energy intensive mechanical refrigeration.

Referring to FIG. 1, an exemplary heat exchanger is generally indicated at 10. In one embodiment, the heat exchanger 10 can be configured to include a series of tubes designed to contain fluid that can be heated or cooled. In another embodiment, the heat exchanger 10 can be configured to include thin shaped heat transfer plates that form a channel designed to contain fluid. With both types of heat exchangers, a second fluid, such as air, runs over the tubes or plates that are being heated or cooled so that the heat exchanger can either provide heat or absorb heat. A set of tubes or plates is sometimes referred to as a bundle and can be made up of several types of tubes or plates. With the heat exchanger 10, it is desirous to optimize a cross flow within the heat exchanger at a lower cost, improve dry and wet airside performance of the heat exchanger, reduce noise, and improve fan performance, while maintaining current architecture, reliability, and cross flow performance.

Figure 2A:
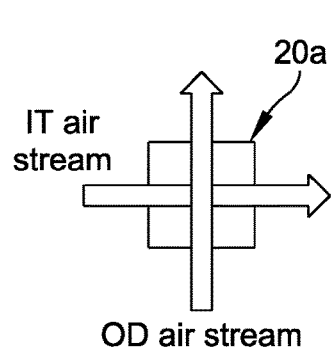
FIGS. 2A-2C are schematic views showing information technology (IT) and outside air streams flowing through a heat exchanger.
Figure 2B:
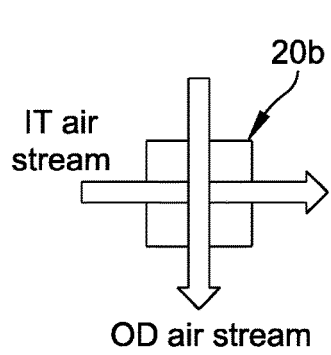
Figure 2C:
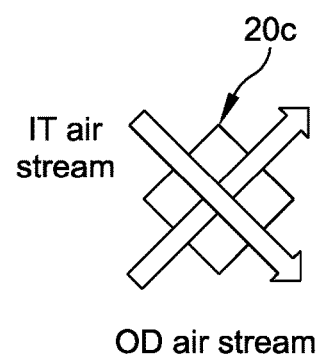

Referring to FIGS. 2A-2C, evaporative heat exchangers are commonly used in industry and, particularly for data center application. As mentioned above, the types of the heat exchangers that are normally used are tube bundle or plate-plate types of heat exchangers, and the flow arrangement typically is a cross flow configuration. There can be up to three types of installations of the heat exchangers according the direction of the air stream of the outdoor (OD) air. In a first type shown in FIG. 2A, a heat exchanger, generally indicated at 20a, is installed parallel to the ground and the information technology (IT) air stream is horizontal (from left to right in FIG. 2A) and the OD air stream is vertical from the bottom to the top of the heat exchanger. In a second type shown in FIG. 2B, a heat exchanger, generally indicated at 20b, is also parallel to the ground and the IT air stream is also horizontal from left to right and the OD air stream is vertical from the top to the bottom of the heat exchanger. In a third type shown in FIG. 2C, a heat exchanger, generally indicated at 20c, is tilted respect to the ground and the IT air stream goes from the top-right to the bottom left, and the OD air stream from the bottom-right to the top-right of the heat exchanger.

The air stream configuration has a great impact on water distribution and how effective surfaces of the heat exchanger are wetted by water sprayed by a water distribution system. With evaporative cooling, spray nozzles are commonly used to distribute water over surfaces of the heat exchanger and the position of the spray nozzles with respect to the heat exchanger and the OD air stream direction plays an important role on the performance of the heat exchanger.

Figure 3A:
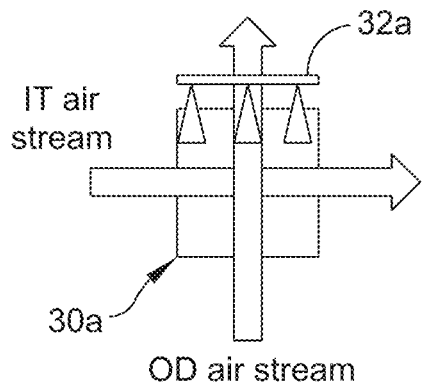
FIGS. 3A and 3B are schematic views showing IT and outside air streams flowing through a heat exchanger and spray nozzles of a water distribution system configured to spray fluid at the heat exchanger.
Figure 3B:
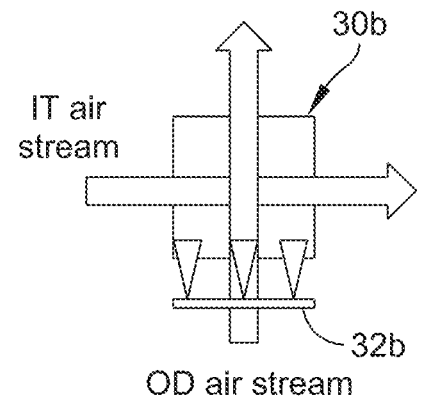

Referring to FIGS. 3A and 3B, and more particularly to FIG. 3A, a heat exchanger, generally indicated at 30a, is configured with an OD air stream from bottom to top and an IT air stream from left to right of the heat exchanger. As shown, spray nozzles, indicated at 32a, are positioned to wet surfaces of the heat exchanger 30a from above the heat exchanger. Similarly, as shown in FIG. 3B, a heat exchanger, generally indicated at 30b, is configured with an OD air stream from bottom to top and an IT air stream from left to right of the heat exchanger. Spray nozzles, indicated at 32b, are positioned to wet surfaces of the heat exchanger 30b from below the heat exchanger. Such exemplary air stream configurations in heat exchanger architecture is provided to simplify flow management inside heat exchanger particularly when high flow streams are involved and reduce the pressure drops created by high flow streams respect to heat exchangers having the OD air stream from the top to the bottom.

In FIG. 3A, the spray nozzles 32a are positioned to spray cooling fluid at a top of the heat exchanger 30a. In this embodiment, water distribution cannot be uniform over surfaces of the heat exchanger 30a because the drops created by the spray nozzles fall inside the heat exchanger by gravity and the OD air stream pushes away the drops thereby inhibiting water from entering the heat exchanger. Due to the foregoing, with this arrangement, it is not possible to have an effective distribution of the water over the entire surface of the heat exchanger 30a. Furthermore, small size drops cannot be used and as consequence part of the evaporative effect is lost.

FIG. 3B shows the heat exchanger 30b having spray nozzles 32b positioned at a bottom of the heat exchanger. In this embodiment, water distribution is not uniformly distributed over the entire surface of the heat exchanger 30b since gravity tends to impede water to get in the heat exchanger. As a consequence, only the bottom surface of the heat exchanger 30b is wetted. Thus, the heat exchanger 30b works as a drop separator particularly when the heat exchanger is relatively large in size.

Figure 4:
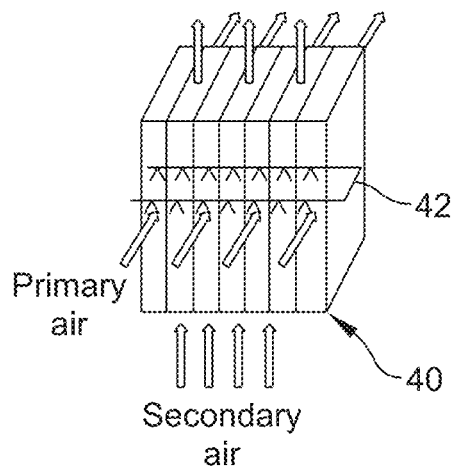
FIG. 4 is a perspective view showing IT and outside air streams flowing through heat exchangers and spray nozzles of a water distribution system positioned within the heat exchangers to spray fluid at the heat exchangers.

Referring to FIG. 4, in order to solve the previous problem of effectively wetting the heat exchanger, a heat exchanger, generally indicated at 40, includes spray nozzles 42 that are located inside (particularly in the middle) of the heat exchanger. In this embodiment, drops of water created by the spray nozzles 42 are spread out over the surface of the heat exchanger 40 more uniformly since gravity and the OD air stream, even acting in opposing directions, can almost completely wet uniformly an entire surface of the heat exchanger.

Figure 5:
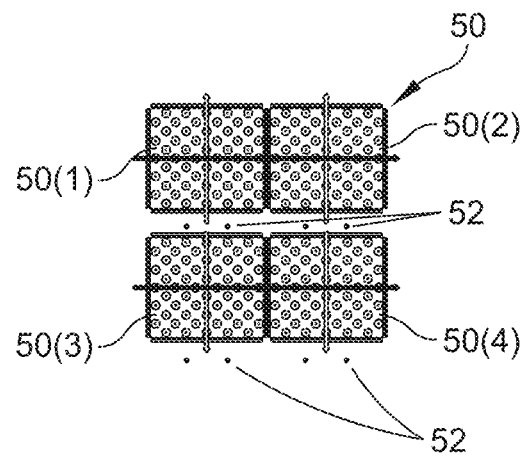
FIG. 5 is a schematic view showing IT and outside air streams flowing through heat exchangers and spray nozzles of a water distribution system positioned between the heat exchangers to spray fluid at the heat exchangers.

Referring to FIG. 5, a heat exchanger, generally indicated at 50, includes four (4) sub-heat exchangers, indicated at 50(1), 50(2), 50(3), 50(4). As used herein, sub-heat exchangers are sometimes referred to as heat exchanger subassemblies. There are solutions to effectively wet the entire heat exchanger 50 or selective sub-heat exchangers 50(1), 50(2), 50(3), 50(4) that involve previous approaches described herein. In one example, spray nozzles, together indicated at 52, can be located both in the middle of sub-heat exchangers 50(1), 50(3) and sub-heat exchangers 50(2), 50(4) and on the bottom of sub-heat exchangers 50(3), 50(4).

Figure 6:
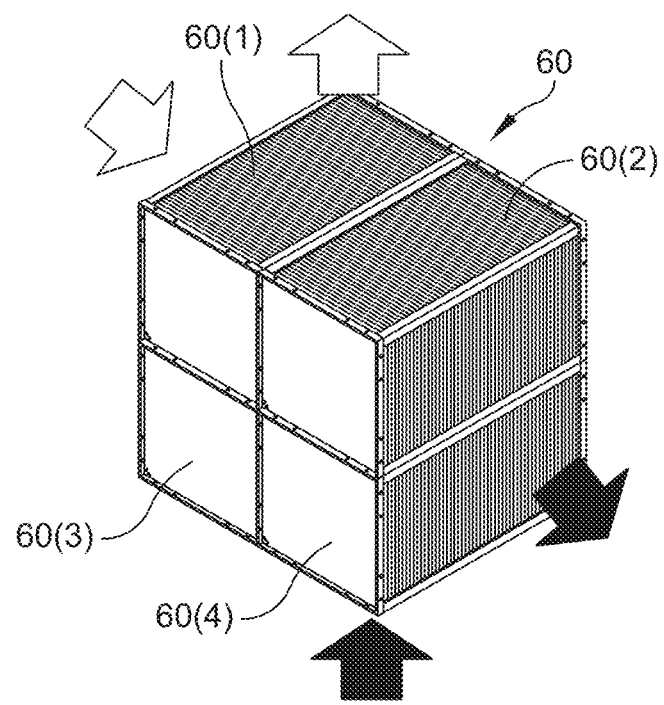
FIG. 6 is a perspective view of one example of sub-heat exchangers.

Referring to FIG. 6, in one embodiment, a heat exchanger, generally indicated at 60, includes four (4) sub-heat exchangers 60(1), 60(2), 60(3), 60(4). In some instances, this may be a requirement for large heat exchangers, because there are some technological constraints in the dimension of tooling for cutting and shaping the single metal plates.

Figure 7:
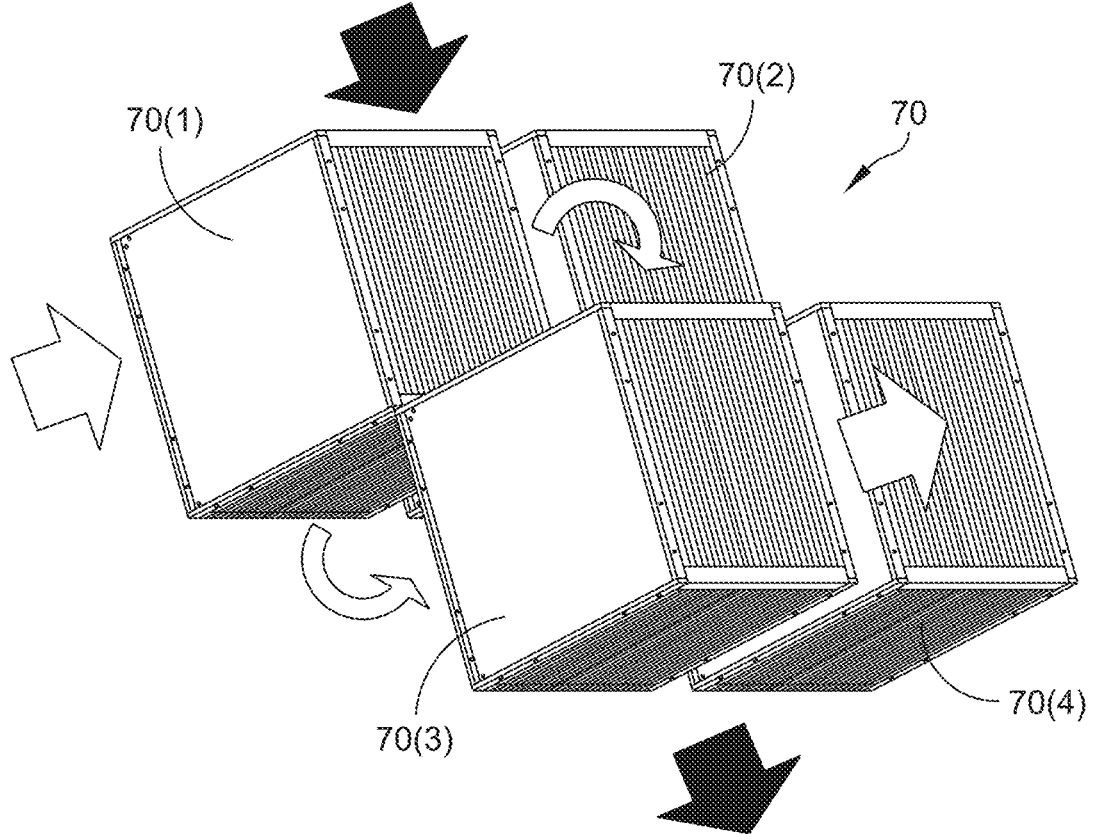
FIG. 7 is a perspective view of another example of sub-heat exchangers.

Referring to FIG. 7, a heat exchanger, generally indicated at 70, of another embodiment includes four (4) sub-heat exchangers 70(1), 70(2), 70(3), 70(4) that are oriented with respect to one another in a unique way.

Figure 8:
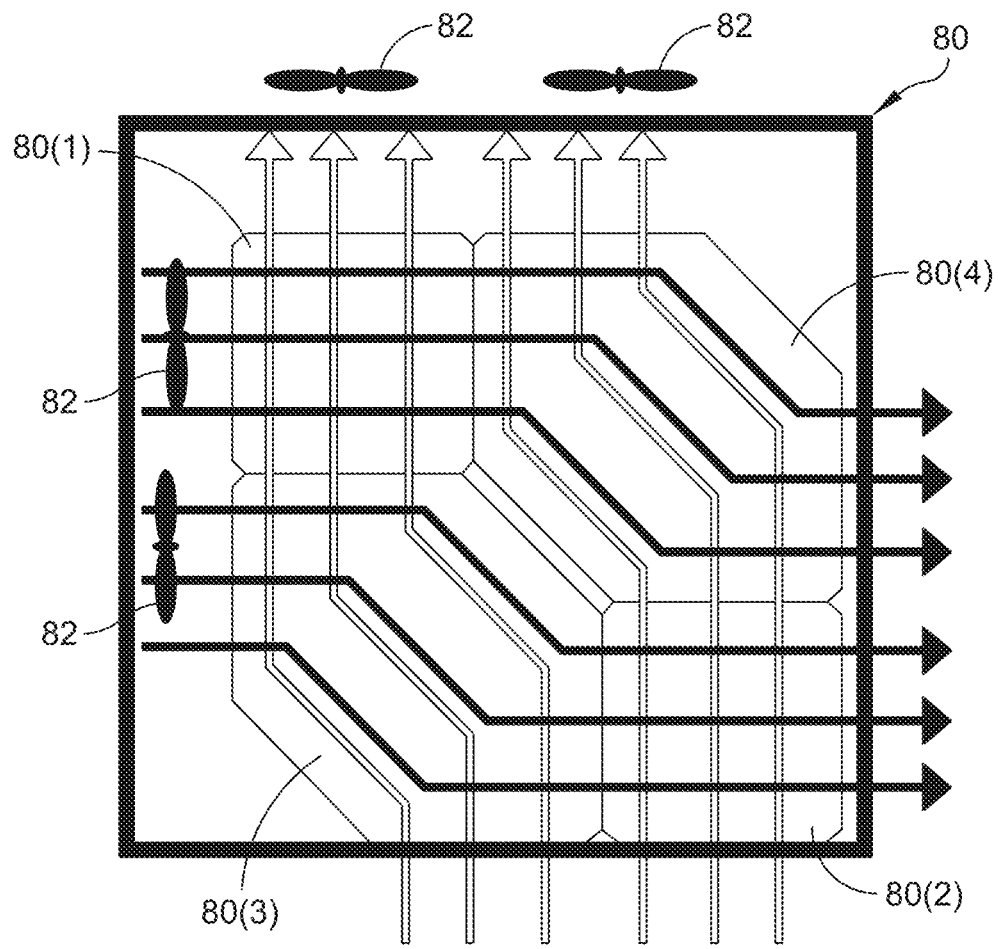
FIG. 8 is a schematic view of airflow through a heat exchanger.

Referring to FIG. 8, a heat exchanger, generally indicated at 80, of another embodiment is illustrated. As shown, the heat exchanger 80 is configured to use two (2) crossflow sub-heat exchangers (as represented by the square heat exchangers 80(1), 80(2)) and two (2) counterflow sub-heat exchangers (as represented by the hexagonal heat exchangers 80(3), 80(4)). Fans, each indicated at 82, can be provided to move air across the crossflow and counterflow sub-heat exchangers 80(1), 80(2), 80(3), 80(4). It should be understood that the concepts disclosed herein can be applied to any type of heat exchanger having crossflow within the heat exchanger, and that the provision of heat exchanger 80 is for illustration purposes only.

Figure 9A:
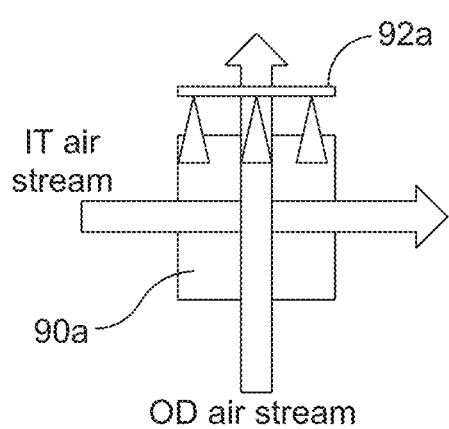
FIGS. 9A and 9B are schematic views showing IT and outside air streams flowing through a heat exchanger and spray nozzles of a water distribution system being selectively configured to spray fluid at the heat exchanger.
Figure 9B:
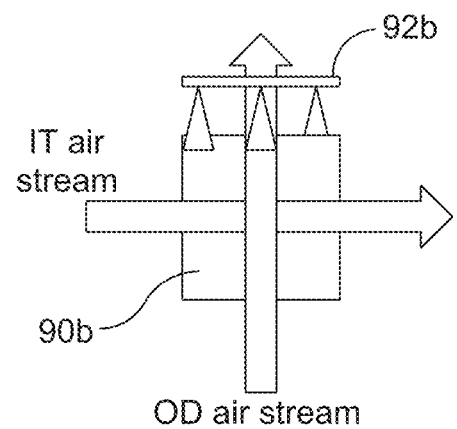

Referring to FIGS. 9A and 9B, heat exchangers, generally indicated at 90a, 90b, include a spray assembly having spray nozzles 92a, 92b, respectively, which are positioned above their heat exchanger to wet the heat exchanger. In some embodiments, a strategy to control the amount of water sprayed on the heat exchanger depends on the operational mode of the heat exchanger. For example, one strategy control can include a full operation mode that includes activating all of the spray nozzles 92a to spray water on its respective heat exchanger 90a. This full operation mode is illustrated in FIG. 9A. The strategy control can include a multistep operation mode that includes only a certain number of spray nozzles 92b that are activated, with the number of the activated spray nozzles to wet the heat exchanger 90b being increased as the water needed is increased. This multistep operation mode is illustrated in FIG. 9B. In this multistep operation, the spray nozzles 92b activated at a certain step are located in order to uniformly wet the surface of the heat exchanger 90b.

In both cases the spray nozzles are located in such a way to distribute the water as more uniformly as possible over the heat exchanger surface. In other words, if full operation mode is used, the water is spread out over the surface and, at partial load, most of the water will not be evaporated and will be collected and recirculated to be spread out again. If a multistep operation is used, the amount of water is modulated according to the cooling load in order to have less water to be recirculated, but water is again uniformly distributed over the surface of the heat exchanger.

All the spray nozzle arrangements described above are configured for a flow arrangement where the OD air flows goes from the bottom to the top of the heat exchanger, and their control strategies are focused on how to distribute the water as efficiently as possible on the surfaces of the heat exchanger. This strategy does not minimize the water consumption respect to the cooling capacity. Nowadays water is considered more and more an important resource and its usage is encouraged to be limited. Water distribution systems are configured to collect water that is not evaporated and to recirculate the collected water to be sprayed again over the heat exchanger. With most if not all water distribution systems, pumping energy is required for moving the water. Water loss is also incurred. In fact, water is used to vaporize and as consequence increases the heat exchanged in the heat exchanger. The vaporization reduces the amount of water in the system, which is recirculated so sometimes it must be refilled. In other words, when water is used, less compressor power is used, but nonetheless water is consumed. One issue is how to minimize water consumption and/or energy usage for water recirculation and, at the same time, assuring the required cooling capacity is provided to the cooling load.

It may be recognized that not all the portions of the heat exchanger work with the same effectiveness. As a consequence, heat flux exchanged between the hot and cold fluids is not the same in all parts of the heat exchanger. Heat flux is less where the difference in temperature between the hot and the cold fluids is less. Conversely, heat flux is more where the difference in temperature between the hot and cold fluids is more.

Figure 10A:
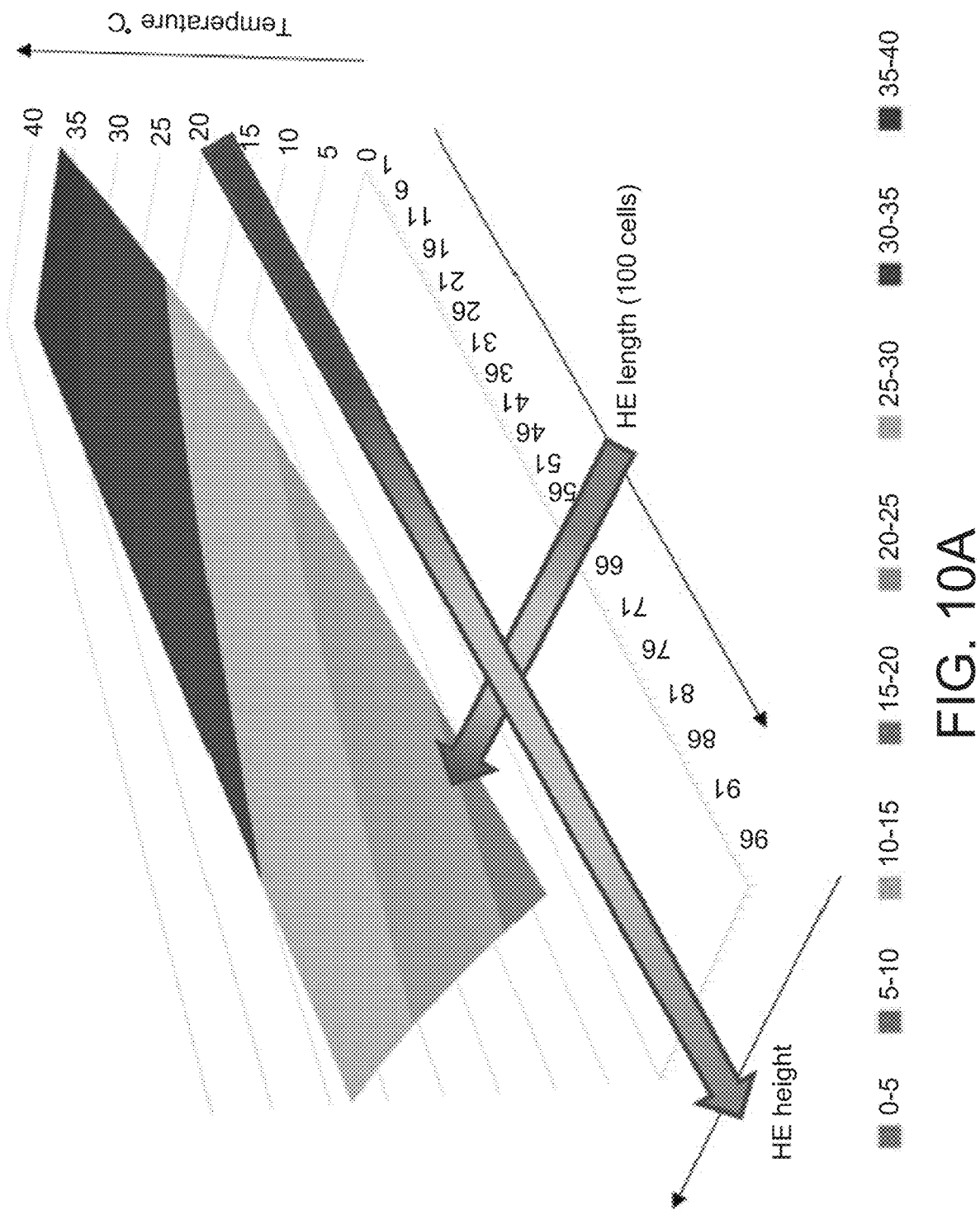
FIGS. 10A-10C are graphs representing temperature changes across surfaces of a heat exchanger.
Figure 10B:
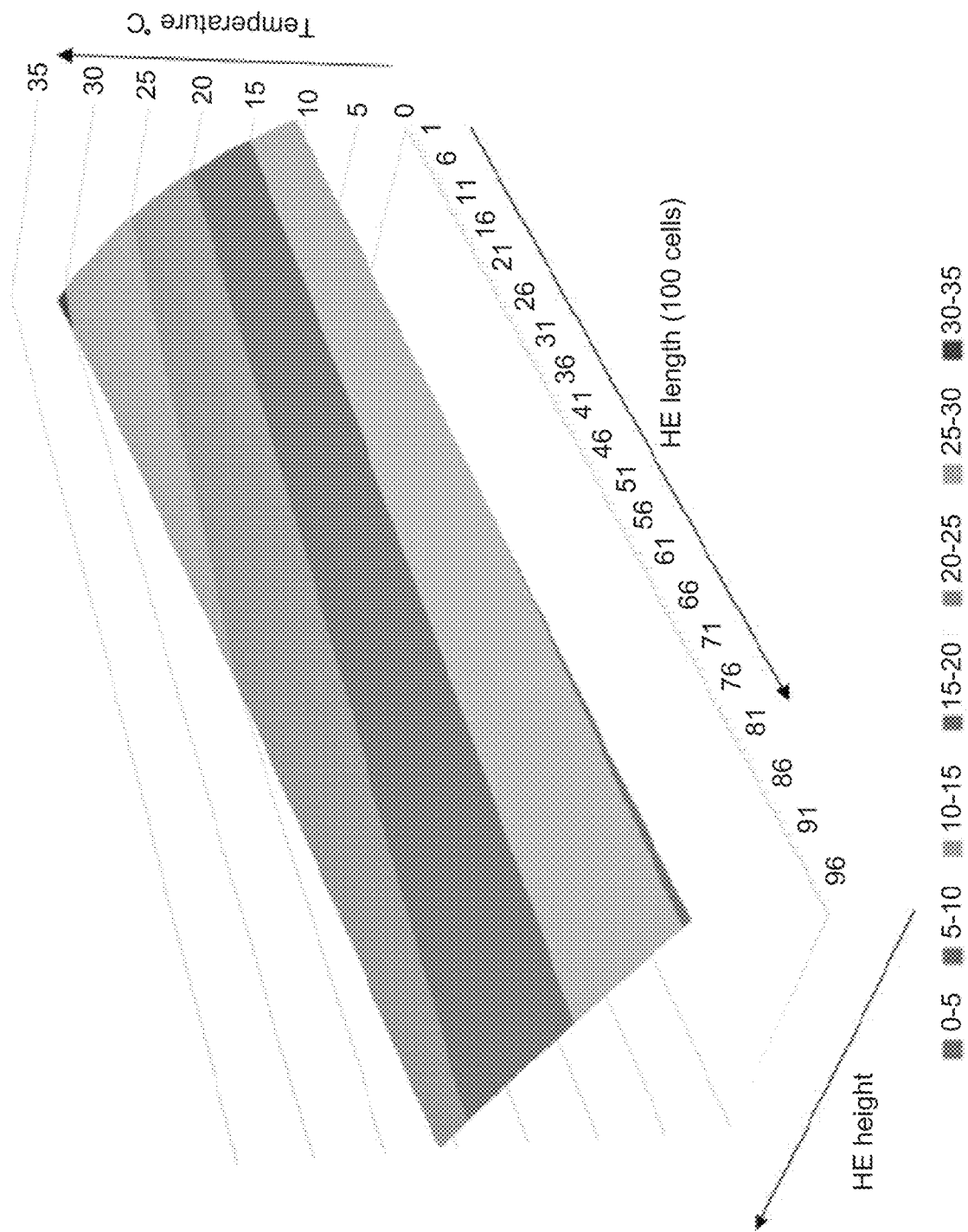
Figure 10C:
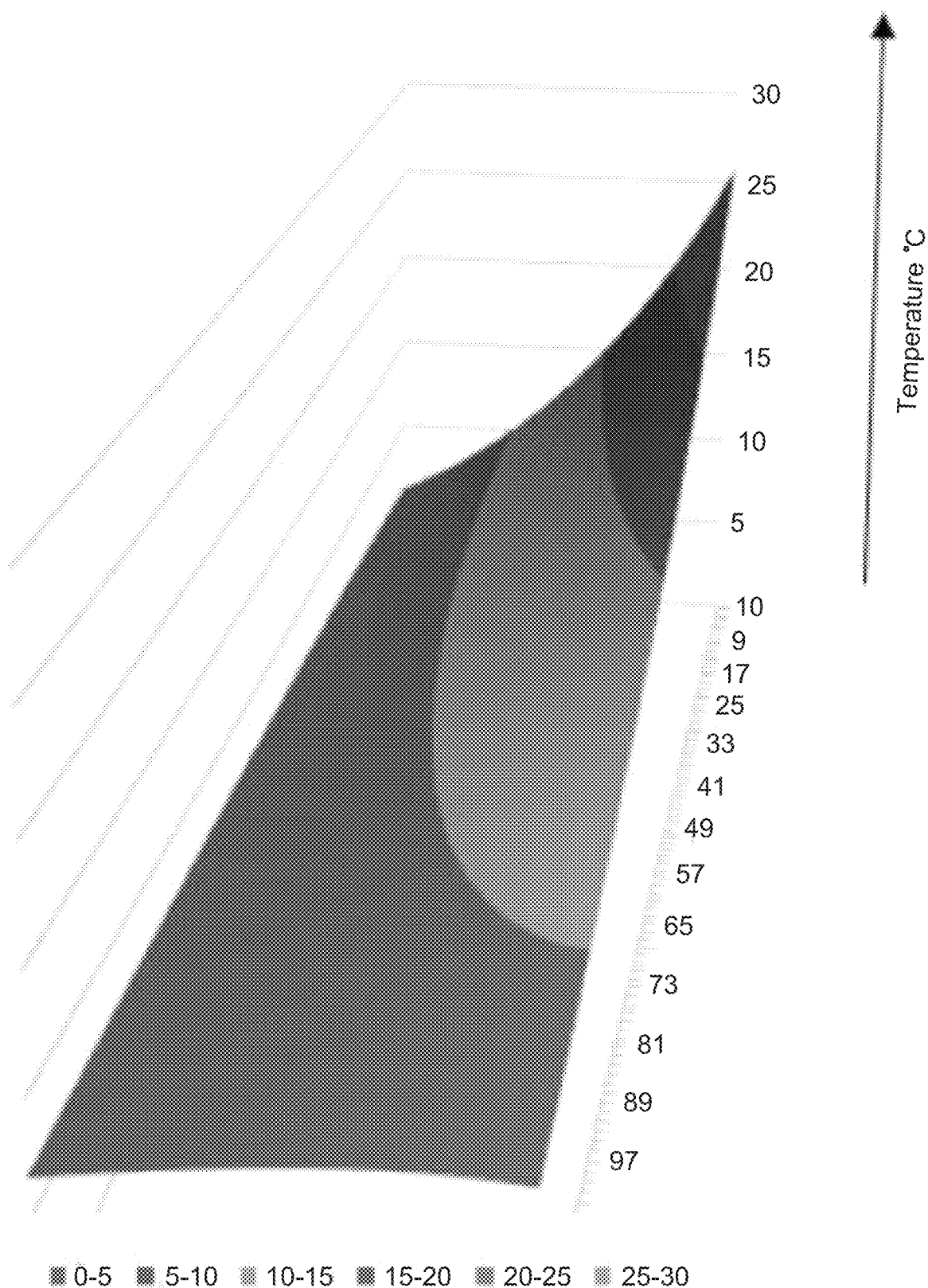

Referring to FIGS. 10A-10C, and particularly to FIG. 10A, IT air temperature on a surface of a heat exchanger is represented at each point of the heat exchanger surface. As shown, the surface exhibits a decreasing temperature IT air stream flow from the inlet section (right/top) to the outlet section (left/bottom). In the same way, FIG. 10B shows the temperature surface for the ambient temperature from the inlet section (right/bottom) to the outlet (left/top). FIG. 10C shows the difference between the IT temperature surface and an OD temperature surface. FIG. 10C clearly shows that not all of the heat exchanger participates to the cooling the IT air stream in the same way, but the areas with the higher temperature differentials cool down more, and the areas with lower temperature differentials cool down less. As a result, not all the portions of the heat exchanger work with the same effectiveness and the same temperature difference between the hot and cold fluid. As a consequence, the heat flux exchanged between the hot and cold fluid is not the same in any part of the heat exchanger.

Figure 11:
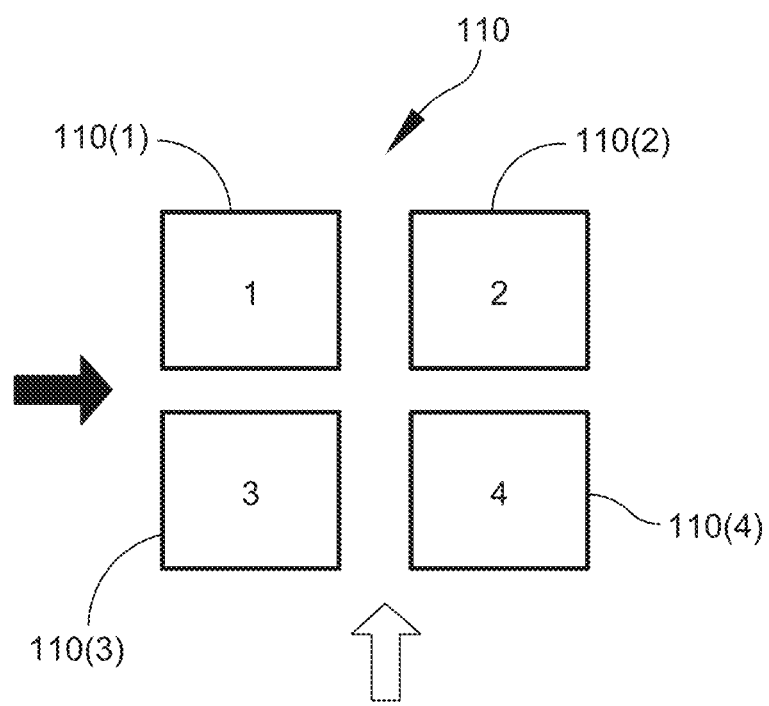
FIG. 11 is a schematic view of a heat exchanger having four (4) sub-heat exchangers.

Referring to FIG. 11, an exemplary heat exchanger, generally indicated at 110, includes four (4) sub-heat exchangers 110(1), 110(2), 110(3), 110(4). When the selective surfaces of the sub-heat exchangers 110(1), 110(2), 110(3), 110(4) are wetted, the heat exchange process of the heat exchanger 110 is enhanced. As will be shown with reference to FIGS. 12A-12G below, it is more effective to selectively wet the most difficult portions of the sub-heat exchangers 110(1), 110(2), 110(3), 110(4), instead of wetting all surfaces of the sub-heat exchangers.

In one example in which the IT inlet temperature is 36.5° C., IT air flow is 56000 $m^3/h$, OD air flow 54000 $m^3/h$ and the heat exchanger 110 is configured with the four (4) sub-heat exchangers 110(1), 110(2), 110(3), 110(4), which is illustrated in FIG. 11. The heat exchanger 110 is also configured so that hot air (IT air) moves from the left to the right within the heat exchanger, and the cool air (OD air) moves from the bottom to the top of the heat exchanger.

Figure 12A:
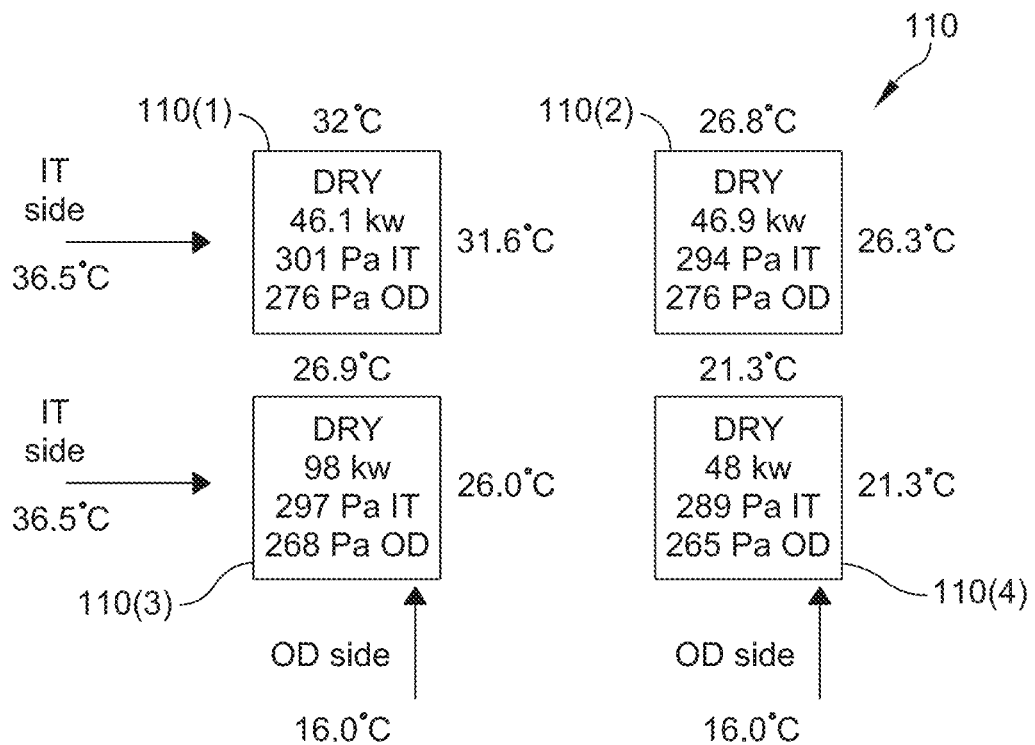
FIGS. 12A-12H are schematic views showing cooling capacities in certain modes of the sub-heat exchangers.

Referring to FIG. 12A, with one calculation, the heat exchanger 110 is in a dry mode of operation and with an OD temperature equal to 16° C. The total cooling capacity of the heat exchanger 110 is 98+46.1+49.9+48=242 KW. This cooling capacity of the heat exchanger 110 will be kept as reference in the following calculations (sometimes referred to as the "baseline cooling capacity"). The #3 sub-heat exchanger 110(3) performs at a higher level because of the higher temperature difference between the hot and the cold stream. The #1, #2 and #4 sub-heat exchangers 110(1), 110(2), 110(4) perform more or less at the same cooling capacity.

Figure 12B:
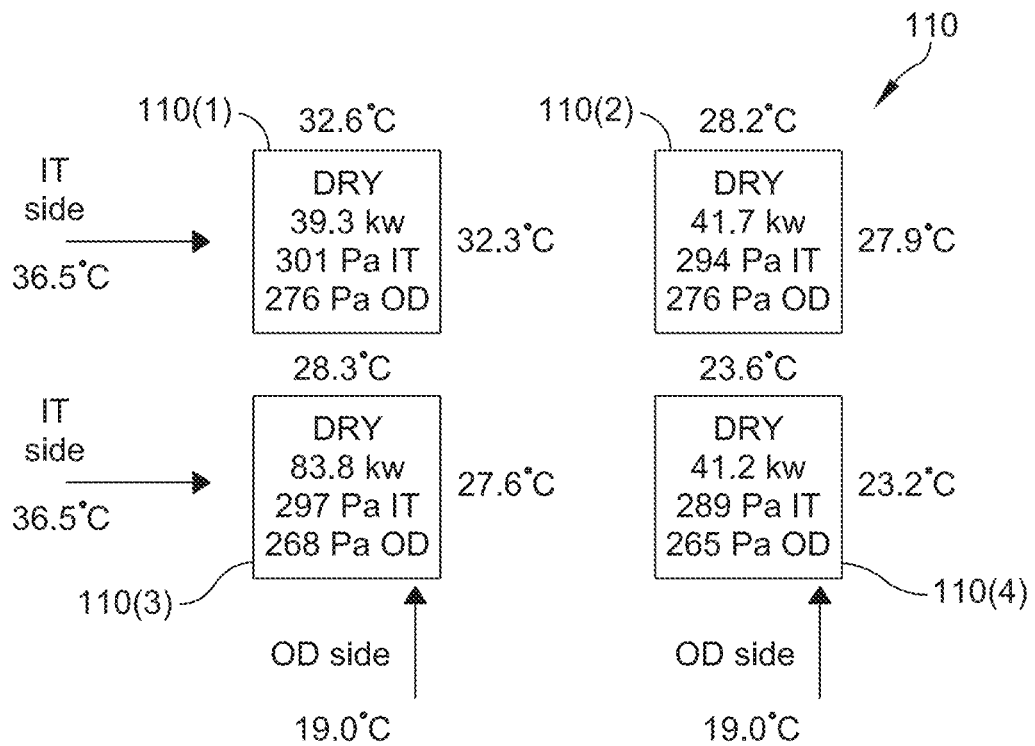

Referring to FIG. 12B, with another calculation, the heat exchanger 110 is provided in dry mode of operation, with an OD temperature equal to 19° C. (3° C. more than the previous calculation illustrated in FIG. 12A). The cooling capacity of the heat exchanger 110 with this calculation is less than the cooling capacity of the previous calculation due to the higher OD temperature. This gap in cooling capacity of the heat exchanger 110 must be recovered when the wet mode of operation is activated. The total cooling capacity of the heat exchanger 110 is 83.8+39.3+41.7+41.2=206 KW. Again the #3 sub-heat exchanger 110(3) performs at a higher level because of the higher temperature difference between the hot and the cold stream. The #1, #2 and #4 sub-heat exchangers 110(1), 110(2), 110(4) perform more or less at the same cooling capacity.

Figure 12C:
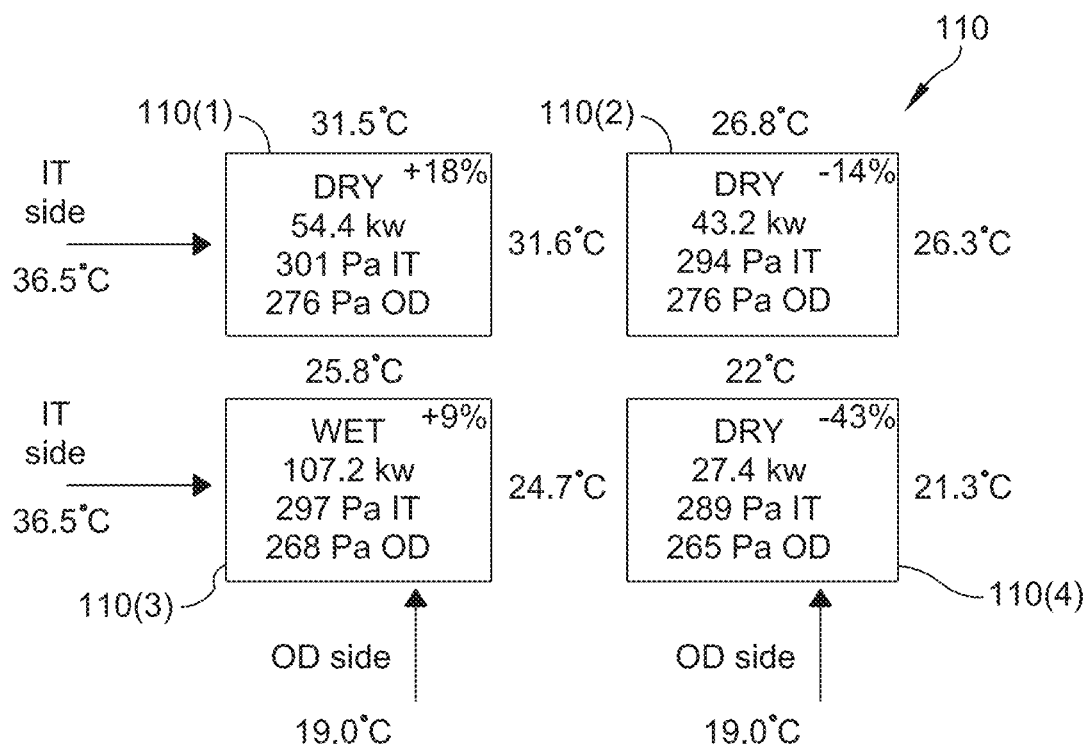

Referring to FIG. 12C, with another calculation, the heat exchanger 110 is in a wet mode of operation, with only the #3 sub-heat exchanger 110(3) being wetted. The total cooling capacity of the heat exchanger 110 is 107.4+54.4+43.2+27.4=232.4 KW (−4% respect to the baseline cooling capacity). Even if only ¼ of the entire heat exchanger 110 is wetted, i.e., the #3 sub-heat exchanger 110(3), the total cooling capacity of the heat exchanger 110 is only 4% lower respect to the baseline cooling capacity. The water consumption can be roughly estimated as one-fourth (¼) of the full wet applied to all of the sub-heat exchangers 110(1), 110(2), 110(3), 110(4). This effect is due to the fact that the #3 sub-heat exchanger 110(3) performs relatively better because it is being wetted (+9%). Also, the #1 sub-heat exchanger 110(1) performs better (+18%) because the intermediate OD temperature is kept lower with respect to the baseline cooling capacity. However, the #2 sub-heat exchanger 110(2) works performs relatively worse (−43%) because the intermediate IT temperature is lower than the baseline cooling capacity. The #4 sub-heat exchanger 110(4)

also performs relatively worse for the same reason. At a high level, the better performances of the #3 sub-heat exchanger 110(3) and the #1 sub-heat exchanger 110(1) compensate the worse performances of the #2 sub-heat exchanger 110(2) and #4 sub-heat exchanger 110(4).

Figure 12D:
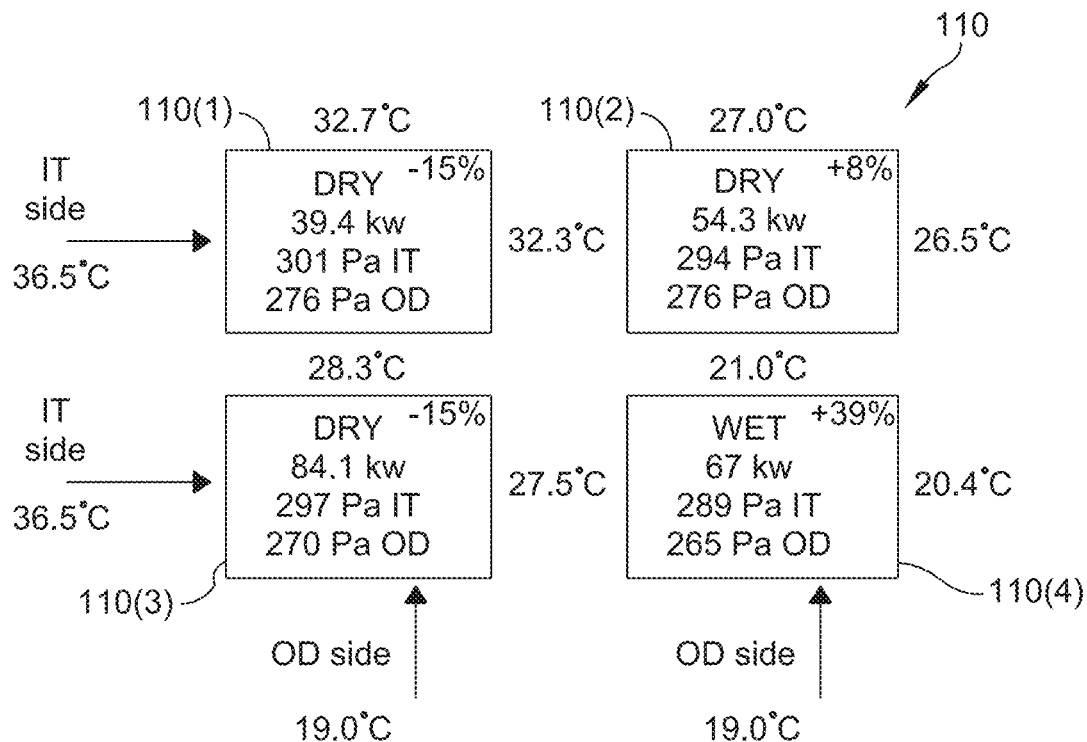

Referring to FIG. 12D, with another calculation, the heat exchanger 110 is in a wet mode of operation, with only the #4 sub-heat exchanger 110(4) being wetted. The total cooling capacity of the heat exchanger 110 is 84.1+39.4+54.3+ 67=244.8 KW (+1% respect to the baseline cooling capacity). Even if only one-fourth (¼) of the entire heat exchanger 110 is wetted, the total cooling capacity is +1% better that the baseline cooling capacity. In this example, the #4 sub-heat exchanger 110(4) increases in performance 39% and the #2 sub-heat exchanger 110(2) increases in performance 8%. The water consumption can be roughly estimated as one-fourth (¼) of the full wet applied to all of the sub-heat exchangers 110(1), 110(2), 110(3), 110(4).

Figure 12E:
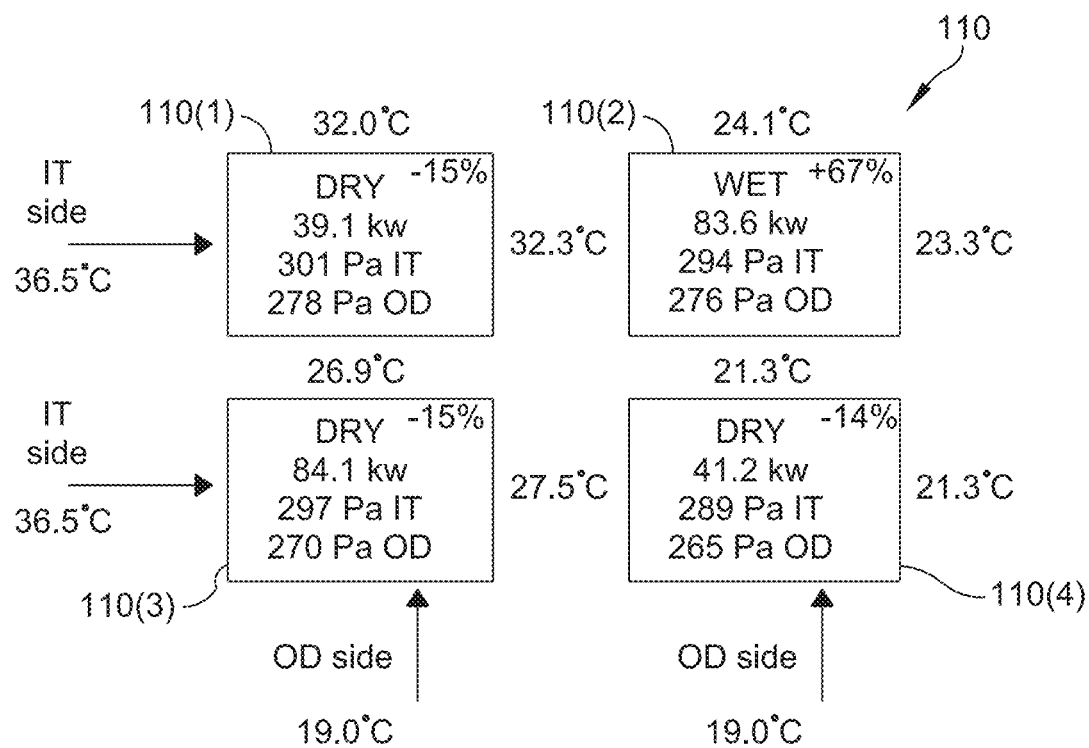

Referring to FIG. 12E, with another calculation, the heat exchanger 110 is in a partially wet mode of operation, with only the #2 sub-heat exchanger 110(2) being wetted. The total cooling capacity of the heat exchanger 110 is 84.1+ 39.1+83.6+41.2=248 KW (+3%). Even if only one-fourth (¼) of the entire heat exchanger 110 is wetted, the total cooling capacity is +3% better that the baseline cooling capacity. This performance is due to the wetted the part of the heat exchanger 110 being under worse conditions in a dry condition, i.e., where the temperature difference between the ID temperature and OD temperature is lower. The water consumption can be roughly still estimated as one-fourth (¼) of the full wet condition. This is the best performing calculation of the calculations shown in FIGS. 12A-12H because the cooling capacity increases 3% with only one-fourth (¼) of the water used.

Figure 12F:
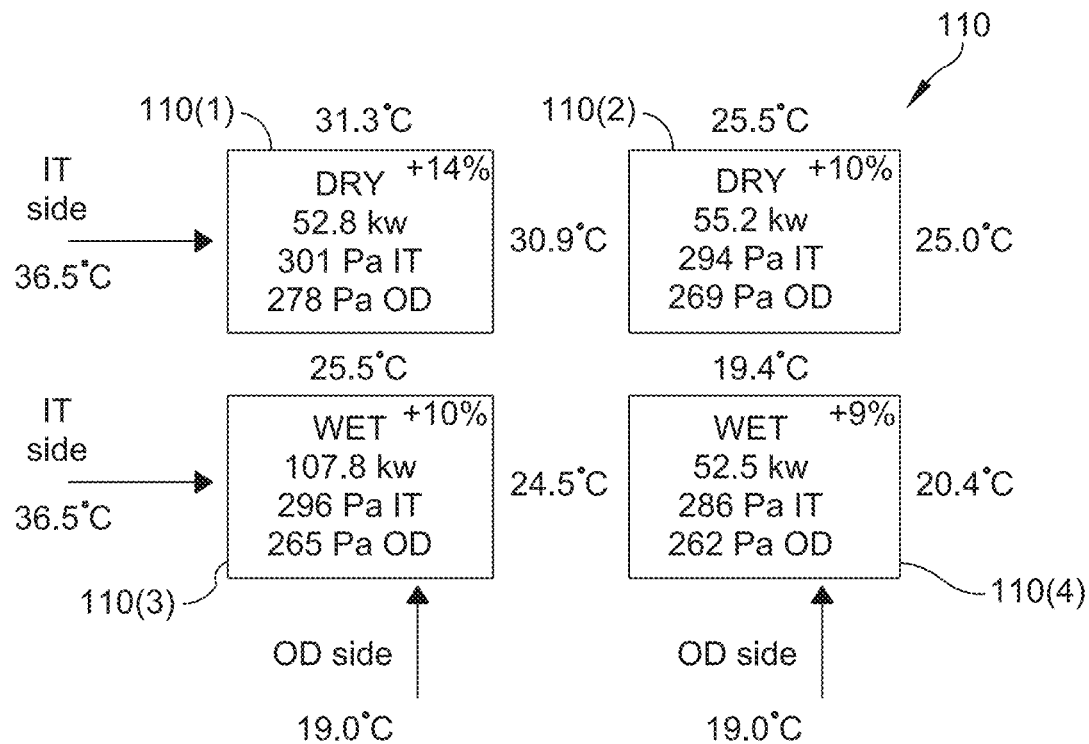

Referring to FIG. 12F, with another calculation, the heat exchanger 110 is in a partially wet mode of operation, with the #3 sub-heat exchanger 110(3) and the #4 sub-heat exchanger 110(4) being wetted. The total cooling capacity of the heat exchanger 110 is 107.8+52.8+55.2+52.5=268.3 KW (+10,8%). The cooling capacity of the heat exchanger 110 is close to the same of the previous calculation shown in FIG. 12E, with water consumption being roughly estimated as one-half (½) of the full wet condition. This is due to the fact that the #2 sub-heat exchanger 110(2) performs relatively worse because of a lower temperature difference between the IT and OD temperatures. When wetted, the increase of performance of the heat exchanger 110 is relatively more impacting on the overall performance.

Figure 12G:
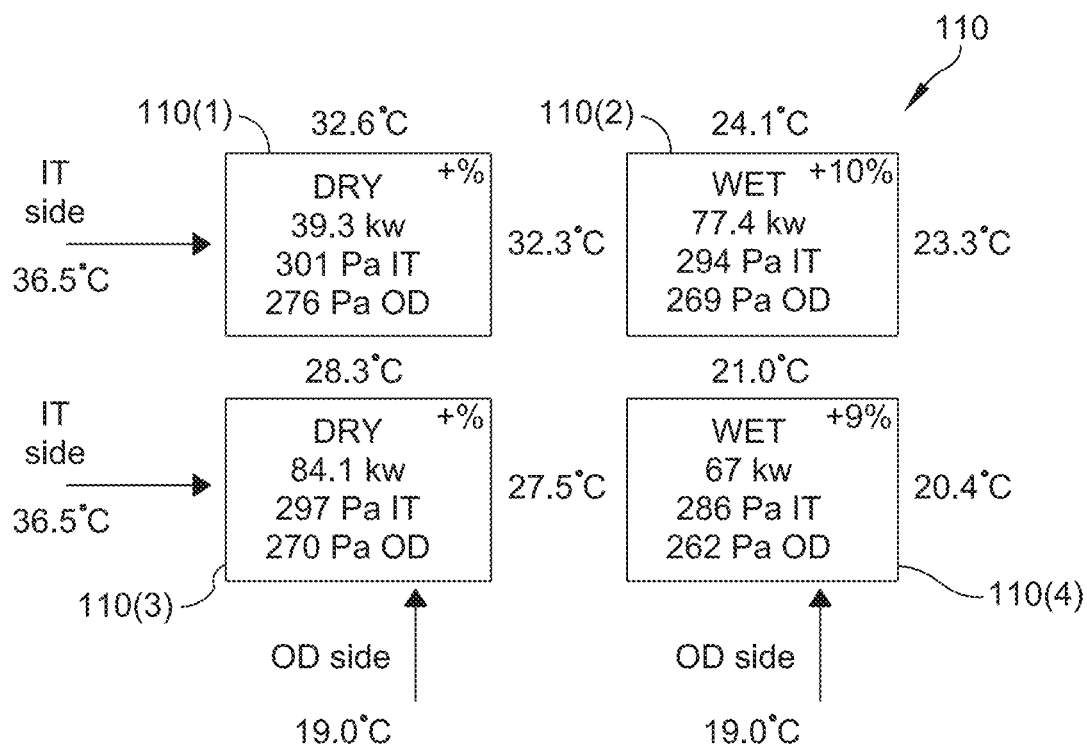

Referring to FIG. 12G, with another calculation, the heat exchanger 110 is in a partially wet mode of operation, with the #2 sub-heat exchanger 110(2) and the #4 sub-heat exchanger 110(4) being wetted. The total cooling capacity of the heat exchanger 110 is 84.1+39.3+77.4+67=267.8 KW (+10%). Also, in this calculation, as with the previous calculation, the cooling capacity of the heat exchanger 110 is close to the same of the previous calculation shown in FIG. 12F, with the water consumption being roughly estimated as one-half (½) of the full wet applied to the heat exchanger. This is due to the fact that the #2 sub-heat exchanger 110(2) performs relatively worse because the lower temperature difference between the IT and OD temperatures. When wetted, the increase of performance of the heat exchanger 110 is relatively more impacting on the overall performance.

Figure 12H:
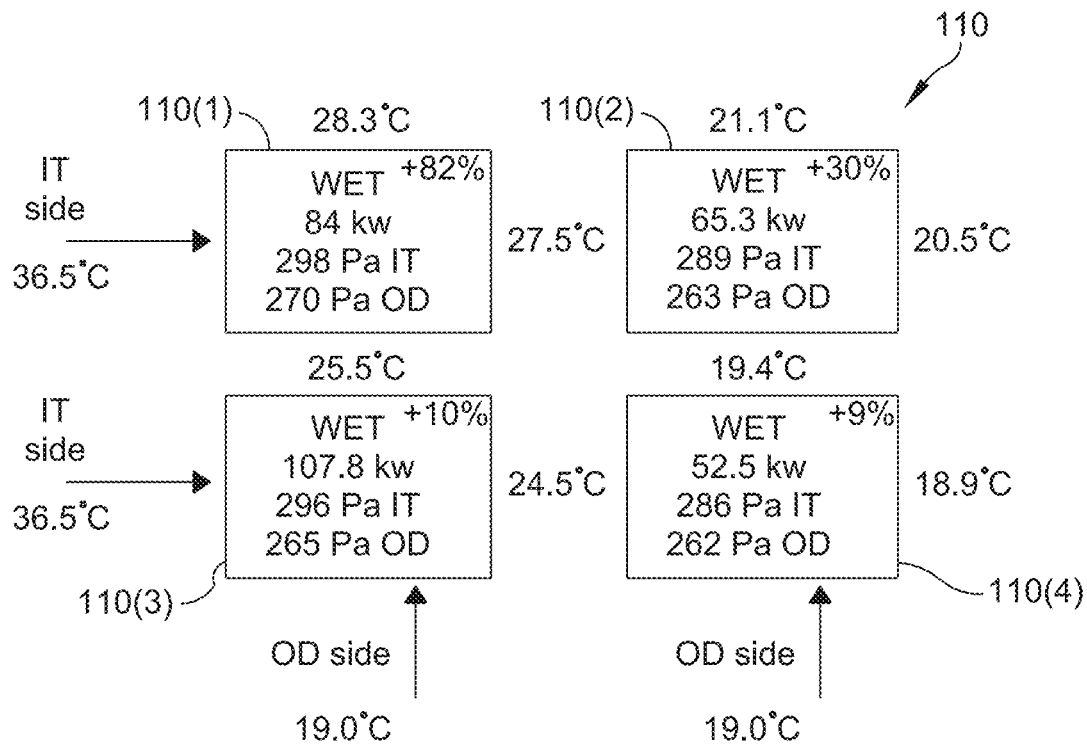

Referring to FIG. 12H, with another calculation, the heat exchanger 110 is fully wetted. The total cooling capacity of the heat exchanger 110 is at a maximum capacity: 107.8+ 84.0+65.3+52.2=309.3 KW (+27%). With this example, the cooling capacity of the heat exchanger 110 is maximized but the water consumption is maximized as well.

Figure 13:
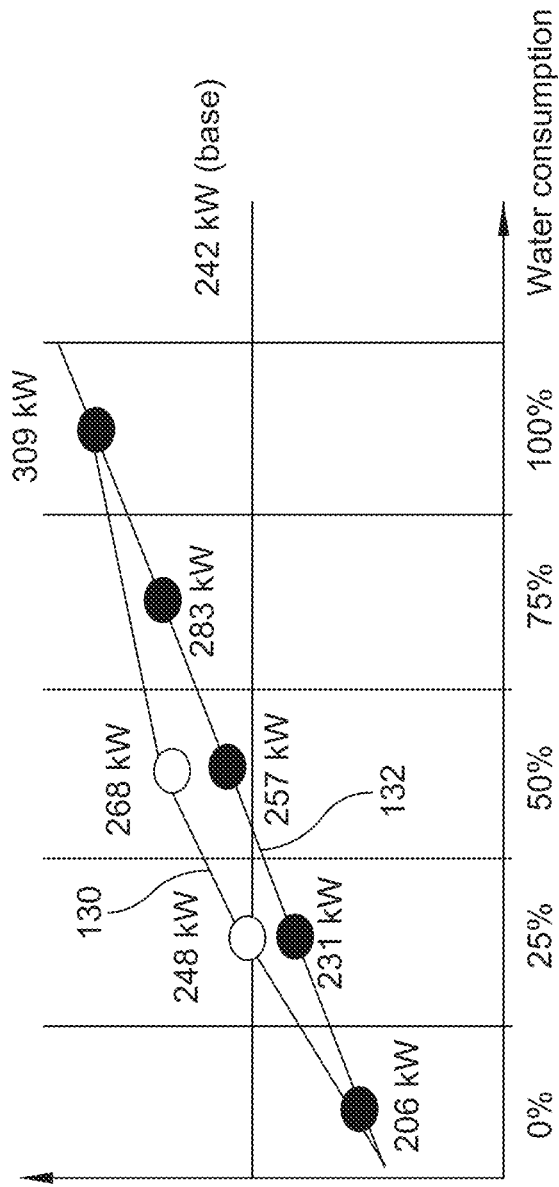
FIG. 13 is a graph representing cooling capacity versus water consumption for the sub-heat exchangers illustrated in FIGS. 12A-12H.

Referring to FIG. 13, according to the previous calculations, a graph showing cooling capacity versus water consumption is illustrated. As shown, the cooling capacity of the heat exchanger 110 by wetting one sub-heat exchanger, e.g., the #2 sub-heat exchanger 110(2) for 25% illustrated by line 130, performs better than by wetting two sub-heat exchangers, e.g., the #3 sub-heat exchanger 110(3) and the #4 sub-heat exchanger 110(4) illustrated by line 132.

Referring to FIG. 14, a table is provided to summarize the result of the calculations shown in FIGS. 12A-12H. It is observed that the increase of the cooling capacity by evaporative cooling is not the same for all the parts of the heat exchanger 110. The most effective part of the heat exchanger 110 is the portions of the heat exchanger spaced from the inlet of the IT air and the inlet of the OD air (identified as the #2 sub-heat exchanger 110(2)). Wetting only this portion of the heat exchanger 110 produces a 13% increase in cooling capacity performance, which is one-half (½) of the increase of the full wetted, with only one-quarter (¼) of the water consumption respect to the full wetted operation. As consequence, one control strategy is to activate the spray nozzles related to the farthest sub-exchanger only, i.e., the #2 sub-heat exchanger 110(2), and later, if a cooling increase is required, the remaining spray nozzles are activated to apply water on the entire heat exchanger 110.

Figure 15A:
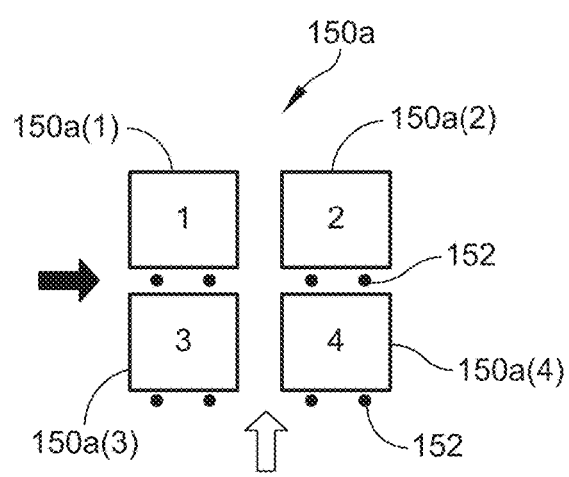
FIG. 15A is a schematic view showing IT and outside air streams flowing through sub-heat exchangers and spray nozzles of a water distribution system of one embodiment of the present disclosure.
Figure 15B:
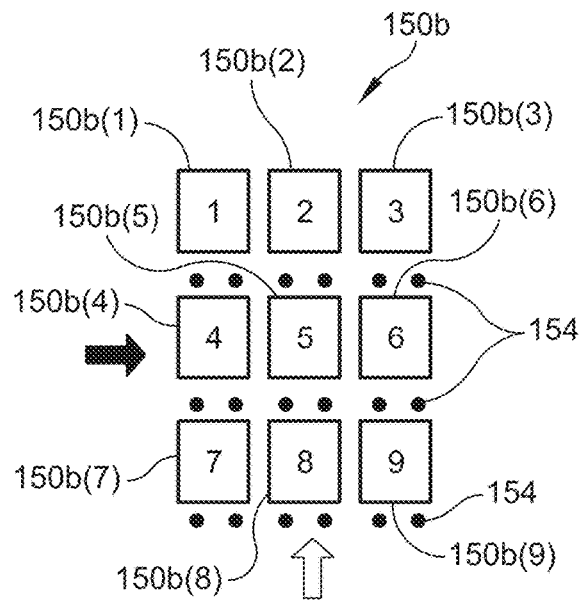
FIG. 15B is a schematic view showing IT and outside air streams flowing through sub-heat exchangers and spray nozzles of a water distribution system of one embodiment of the present disclosure.

Referring to FIGS. 15A and 15B, according to one aspect of the present disclosure, to wet selectively a portion of the surface of the heat exchanger, the cross-flow heat exchanger can include several sub-heat exchangers, such as the heat exchanger 110 and the sub-heat exchangers 110(1), 110(2), 110(3), 110(4) shown in FIG. 11 and in FIGS. 12A-12G.

For instance, and without limitation, in the case in which a heat exchanger, generally indicated at 150a is a plate-plate type of heat exchanger, a temperature image shows a plate-plate heat composed by four (4) sub-heat exchangers 150a (1), 150a(2), 150a(3), 150a(4) (FIG. 15A). The spray nozzles, indicated at 152, are located below each sub-heat exchanger 150a(1), 150a(2), 150a(3), 150a(4). When activated, the spray nozzles 152 spray water over the surfaces of the sub-heat exchangers 150a(1), 150a(2), 150a(3), 150a(4). In fact. the drops created by the spray nozzles 152 are dragged towards the top wetting the surfaces of the sub-heat exchangers 150a(1), 150a(2), 150a(3), 150a(4). The water not evaporated drops down within the heat exchanger 150a, wetting the heat exchanger below the spray nozzles 152. The spray nozzles 152 are not able to wet the entire surface of the #4 sub-heat exchanger 150a(4). Thus, additional spray nozzles 152 must be activated below the #4 sub-heat exchanger 150a(4). Similarly, FIG. 15B shows another heat exchanger 150b having nine (9) sub-heat exchangers 150b (1), 150b(2), 150b(3), 150b(4), 150b(5), 150b(6), 150b(7), 150b(8), 150b(9), and spray nozzles 154.

Figure 16A:
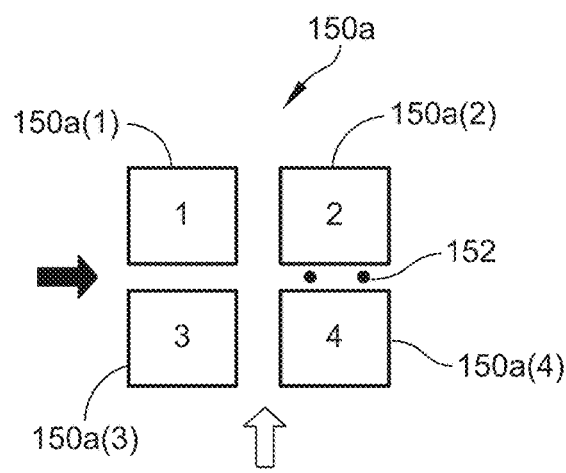
FIGS. 16A and 16B are schematic views of the embodiment illustrated in FIG. 15A showing selective activation of spray nozzles of the water distribution system.
Figure 16B:
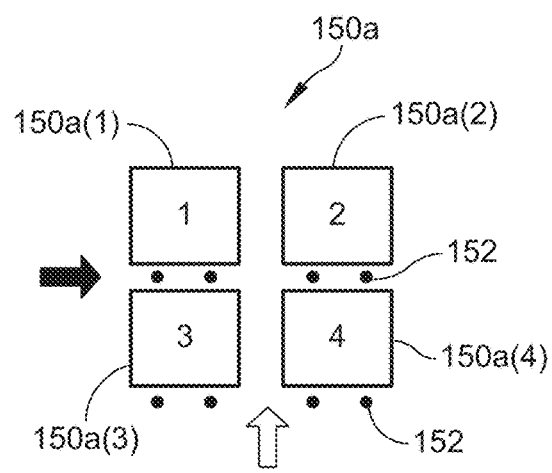

Referring to FIGS. 16A and 16B, with heat exchanger 150a including four (4) sub-heat exchangers 150a(1), 150a (2), 150a(3), 150a(4), a first step activates only the spray nozzles 152 between the #2 sub-heat exchanger 150a(2) and the #4 sub-heat exchanger 150a(4) (FIG. 16A) and a second step activates all of the spray nozzles 152 provided in the heat exchanger (FIG. 16B).

Figure 17A:
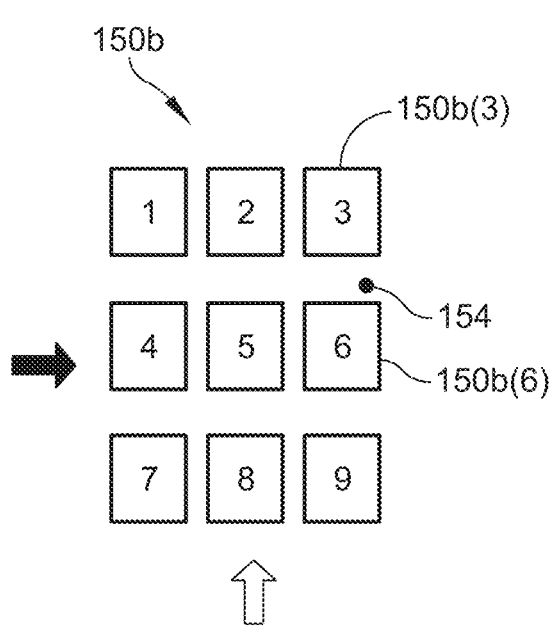
FIGS. 17A-17C are schematic views of the embodiment illustrated in FIG. 15B showing selective activation of spray nozzles of the water distribution system.
Figure 17B:
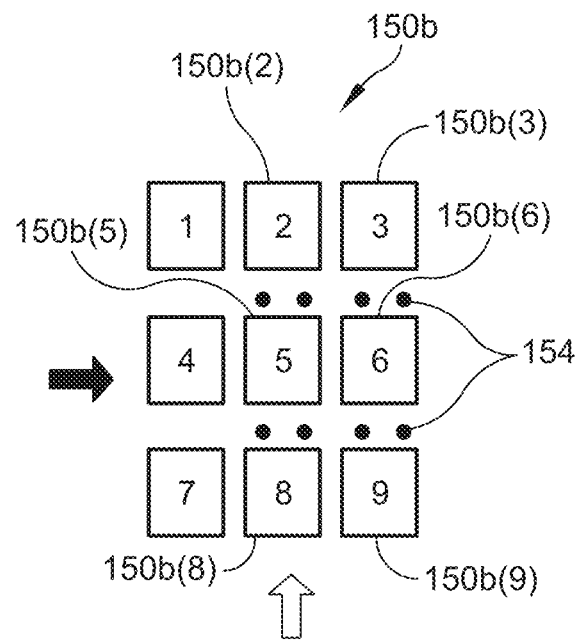
Figure 17C:
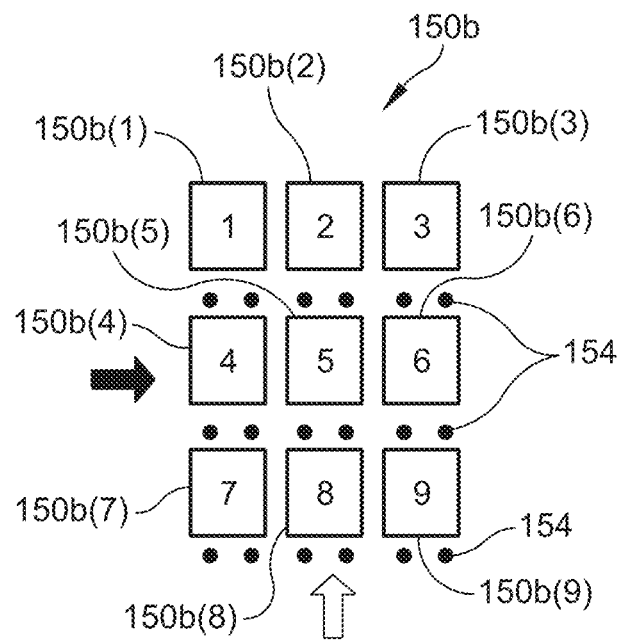

Referring to FIGS. 17A-17C, with the heat exchanger 150b including nine (9) sub-heat exchangers 150b(1), 150b (2), 150b(3), 150b(4), 150b(5), 150b(6), 150b(7), 150b(8), 150b(9), a first step activates only the spray nozzles 154 between the #3 sub-heat exchanger 150b(3) and the #6 sub-heat exchanger 150*b*(6) (FIG. 17A), a second step activates all of the spray nozzles 154 between the #2 sub-heat exchanger 150*b*(2) and the #5 sub-heat exchanger 150*b*(5), the #3 sub-heat exchanger 150*b*(3) and the #6 sub-heat exchanger 150*b*(6), the #5 sub-heat exchanger 150*b*(5) and the #8 sub-heat exchanger 150*b*(8), and the #6 sub-heat exchanger 150*b*(6) and the #9 sub-heat exchanger 150*b*(9) (FIG. 17B), and a third step activates all of the spray nozzles 154 provided in the heat exchanger 150*b* (FIG. 17C).

Embodiments of the heat exchanger of the present disclosure also include a regulation algorithm to control the outlet IT temperature according to availability of the cooling resources and optimizing a parameter. This parameter can be the total absorbed power or the operative cost of the heat exchanger, e.g., the operative cost of fans, the recirculating pump, and water. The cooling resources applied to the heat exchanger involve two components, i.e., the OD fans and the water application system including the spray nozzles.

In one example, the parameter is the total absorbed power. When the OD temperature is sufficiently cold, the OD fans only are activated, and the spray nozzles are deactivated. When the OD temperature increases, the OD fan speed is increased accordingly. Increasing fan speed increases the absorbed power of the system. If the spray nozzles are activated for the #2 sub-heat exchanger only, and the OD fans are reduced, the outlet IT temperature is still on target, but the absorbed power as the sum of the absorbed power of the fans and the recirculating pump is less with respect to absorbed power of the only fans operating at higher speed.

Since the #2 sub-heat exchanger performs best with respect to water consumption, there may be instances in which the maximum cooling capacity is required. In such instances, it may be necessary that the algorithm be able to handle the two different operations.

Figure 18B:
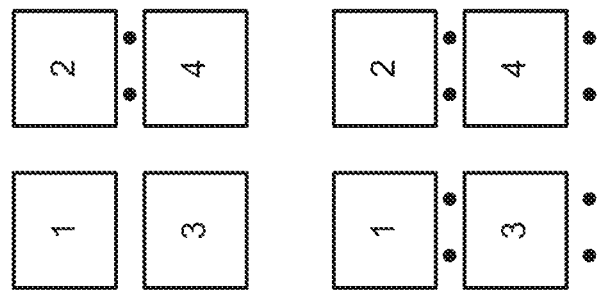
FIG. 18B is a schematic view of the selective activation of spray nozzles within the water distribution system as controlled by the algorithm shown in FIG. 18A.
Figure 18A:
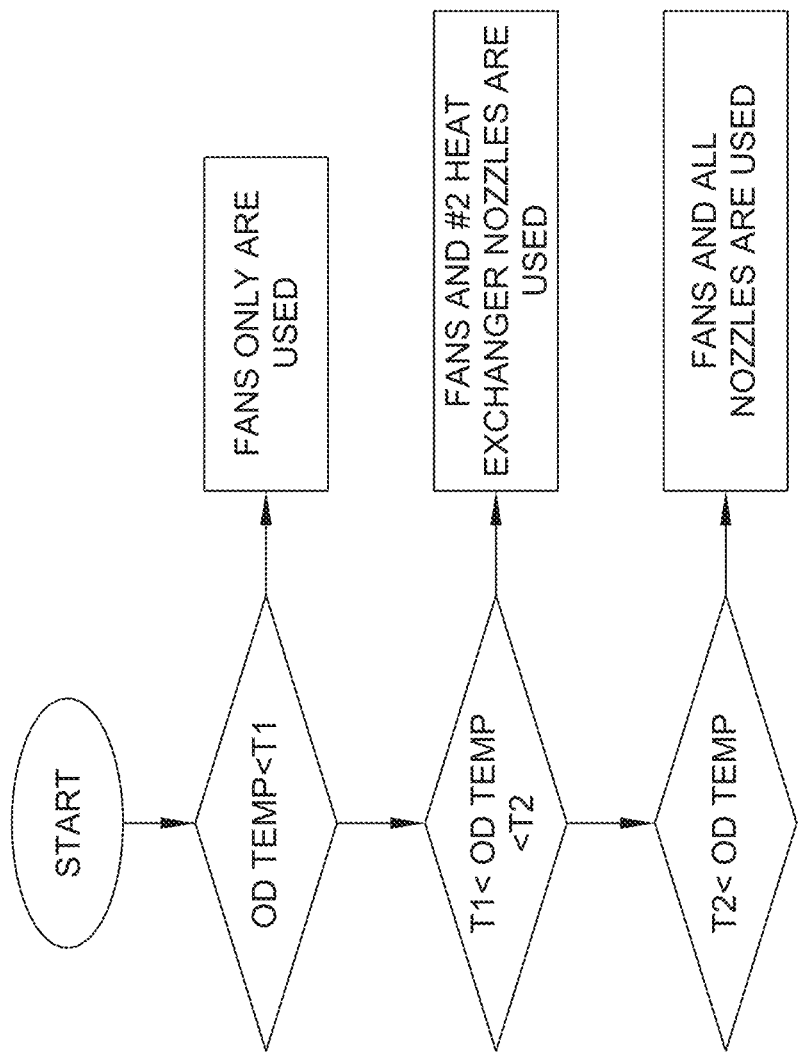
FIG. 18A is a flow chart of an algorithm used to control the operation of spray nozzles of a water distribution system within sub-heat exchangers.

Referring to FIGS. 18A and 18B, at a relatively low OD temperature, the fan(s) run at reduced speed and all the spray nozzles are deactivated. When the OD temperature increases, the fan is progressively sped up. However, the fan speed is not pushed to 100% capacity of the fan. At a first predetermined temperature, e.g., temperature $t_1$, the absorbed power of the fan only at 100% capacity is higher than the fan absorbed power at lower speed plus the power to recirculate water only to the #2 sub-heat exchanger. As shown in FIGS. 18A and 18B, when the OD temperature is greater than $t_1$, the fan is operated at a lower speed and the spray nozzles are activated for the #2 sub-heat exchanger.

When the OD temperature increases beyond a second predetermined temperature, e.g., temperature $t_2$, instead of increasing the fan speed to 100% capacity of the fan, in one embodiment, it is preferable to activate all the spray nozzles and reduce the fan speed.

Figure 19:
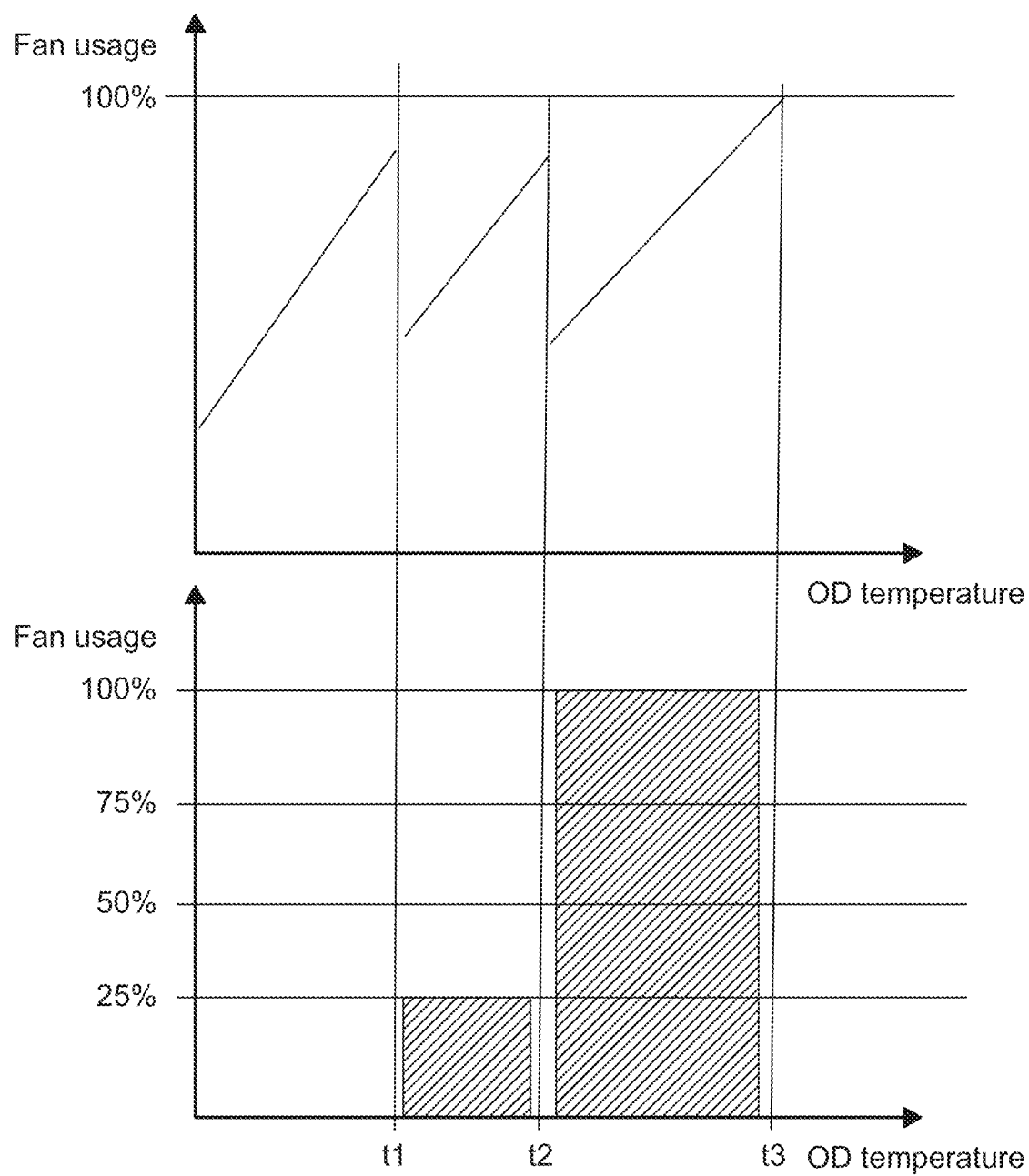
FIG. 19 is a graph showing fan usage and water usage versus outside temperature.

Referring to FIG. 19, the same algorithm can be configured to address cooling capacity at varying temperatures, e.g., temperature $t_3$, to vary water usage.

It should be understood that the systems described herein can be configured to perform methods of cooling. In some embodiments, a method of cooling includes activating a first nozzle configured to spray fluid at a first sub-heat exchanger when an outdoor temperature is below a first threshold temperature, and activating the first nozzle and a second nozzle configured to spray fluid at a second sub-heat exchanger when the outdoor temperature is above the first threshold temperature.

Embodiments of the method further may include activating at least one fan to move air over the first sub-heat exchanger and the second sub-heat exchanger when the outdoor temperature is below a second threshold temperature, which is below the first threshold temperature. The method further may include deactivating the first nozzle when an outdoor temperature is below the second threshold temperature. As described herein, the fan may be positioned proximate the second sub-heat exchanger, with air being configured to flow over the second sub-heat exchanger and then over the first sub-heat exchanger. In some embodiments, the first sub-heat exchanger is positioned adjacent the second sub-heat exchanger. In some embodiments, a third sub-heat exchanger is positioned adjacent the first sub-heat exchanger and a fourth sub-heat exchanger positioned adjacent the second sub-heat exchanger and the third sub-heat exchanger. Nozzles can be positioned between the second sub-heat exchanger and the fourth sub-heat exchanger and between the first sub-heat exchanger and the third sub-heat exchanger. The method further may include activating the fan to move air over the second sub-heat exchanger and the fourth sub-heat exchanger. The method further may include activating the fan to move air over the second sub-heat exchanger and the fourth sub-heat exchanger when the outdoor temperature is below a second threshold temperature. The second threshold temperature is below the first threshold temperature. The method further may include deactivating the first nozzle when an outdoor temperature is below the second threshold temperature.

In some embodiments, a first spray nozzle can be configured to spray fluid at a first heat exchanger and a second spray nozzle can be configured to spray fluid at a second heat exchanger. This concept can be applied to any number of heat exchangers. However, it should be understood that depending on the configuration of the heat exchangers and the spray nozzles that spray nozzles may be configured to overlap slightly or otherwise with one another. Thus, for example, the first spray nozzle can be configured to spray fluid substantially at the first heat exchanger. Similarly, the second spray nozzle can be configured to spray fluid substantially at the second heat exchanger. Spraying substantially at the first heat exchanger subassembly may, in some embodiments, mean spraying at least about 50%, at least about 75%, or at least about 90% of sprayed fluid at the first heat exchanger. It should be understood that each spray nozzle can be configured to spray a desired amount at its respective heat exchanger or heat exchangers up to and including 100% of the sprayed fluid. For example, spraying substantially at the second heat exchanger subassembly may mean spraying at least about 50%, at least about 75%, or at least about 90% of sprayed fluid at the second heat exchanger. The same is true for the remaining heat exchanger subassemblies.

Other aspects of the present disclosure are directed to methods of assembling a heat exchanger. The method may include providing a heat exchanger having two or more sub-heat exchangers that are positioned proximate one another. The method further may include providing a first nozzle configured to spray fluid at a first sub-heat exchanger. The method further may include providing a second nozzle configured to spray fluid at a second sub-heat exchanger. The method further may include providing a controller that is configured to activate the first nozzle to spray fluid at the first sub-heat exchanger when an outdoor temperature is below a first threshold temperature and to activate the first nozzle and the second nozzle to spray fluid at a second sub-heat exchanger when the outdoor temperature is above the first threshold temperature.

The method further may include at least one fan to move air over the first sub-heat exchanger and the second sub-heat exchanger. In some embodiments, the controller further can be configured to activate the fan to move air over the first sub-heat exchanger and the second sub-heat exchanger when the outdoor temperature is below a second threshold temperature. The second threshold temperature is below the first threshold temperature. The controller further can be configured to deactivate the first nozzle when an outdoor temperature is below the second threshold temperature.

The method further may include positioning the fan proximate the second sub-heat exchanger, with air being configured to flow over the second sub-heat exchanger and then over the first sub-heat exchanger. In some embodiments, the first sub-heat exchanger is positioned adjacent the second sub-heat exchanger. The method further may include positioning a third sub-heat exchanger adjacent the first sub-heat exchanger and positioning a fourth sub-heat exchanger adjacent the second sub-heat exchanger and the third sub-heat exchanger. The method further may include positioning the first nozzle between the second sub-heat exchanger and the fourth sub-heat exchanger and positioning the second nozzle between the first sub-heat exchanger and the third sub-heat exchanger. The method further may include positioning the fan proximate the second sub-heat exchanger and the fourth sub-heat exchanger, with air being configured to flow over the second sub-heat exchanger and the fourth sub-heat exchanger and then over the first sub-heat exchanger and the third sub-heat exchanger.

The controller further can be configured to activate the fan to move air over the second sub-heat exchanger and the fourth sub-heat exchanger, and to activate the fan to move air over the second sub-heat exchanger and the fourth sub-heat exchanger when the outdoor temperature is below a second threshold temperature. The second threshold temperature is below the first threshold temperature. The controller further can be configured to deactivate the first nozzle when an outdoor temperature is below the second threshold temperature.

Figure 20:
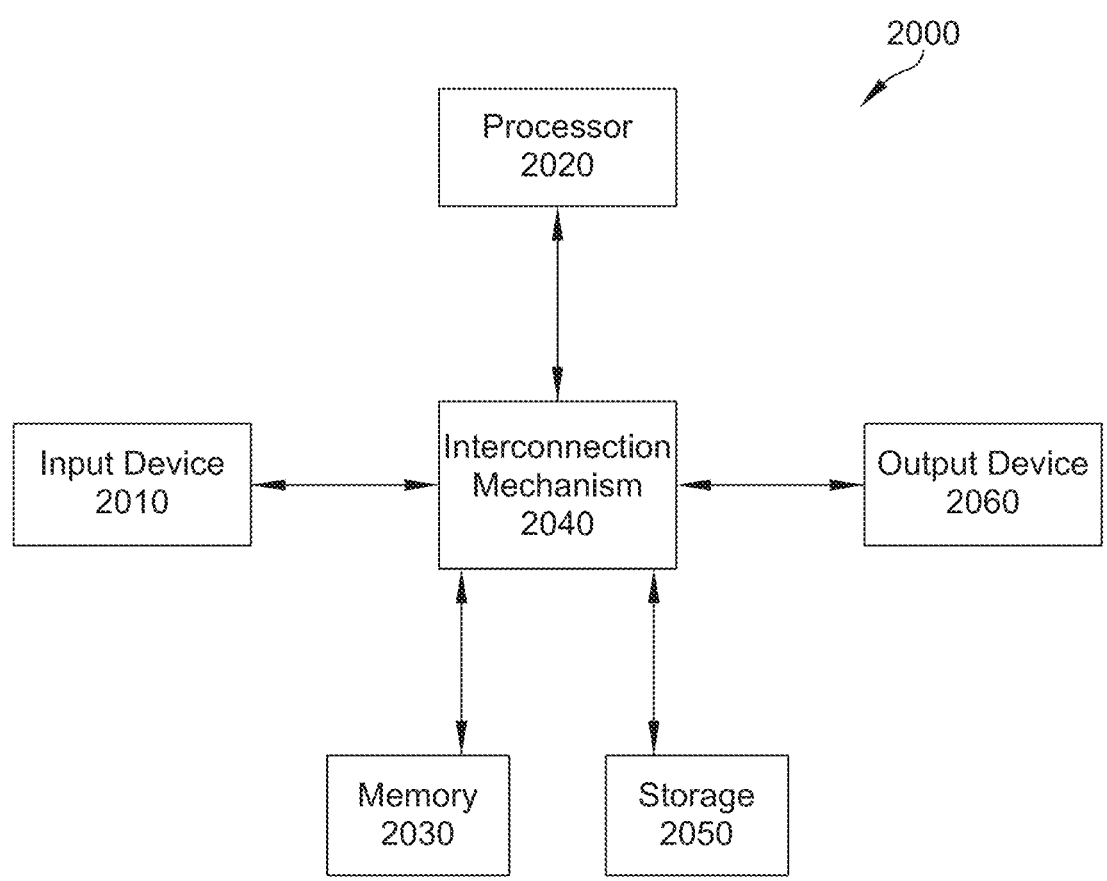
FIG. 20 is a functional block diagram of a general-purpose computer system in accordance with embodiments of this disclosure.

Various embodiments of the disclosure may be implemented as specialized software executing in a computer system 2000 such as that shown in FIG. 20. The computer system 2000 may include a processor 2020 connected to one or more memory devices 2030, such as a disk drive, memory, or other device for storing data. Memory 2030 is typically used for storing programs and data during operation of the computer system 2000. The computer system 2000 may also include a storage system 2050 that provides additional storage capacity. Components of computer system 2000 may be coupled by an interconnection mechanism 2040, which may include one or more busses (e.g., between components that are integrated within the same machine) and/or a network (e.g., between components that reside on separate discrete machines). The interconnection mechanism 2040 enables communications (e.g., data, instructions) to be exchanged between system components of system 2000.

Computer system 2000 also includes one or more input devices 2010, for example, a keyboard, mouse, trackball, microphone, touch screen, and one or more output devices 1160, for example, a printing device, display screen, speaker. In addition, computer system 2000 may contain one or more interfaces (not shown) that connect computer system 2000 to a communication network (in addition or as an alternative to the interconnection mechanism 2040).

Figure 21:
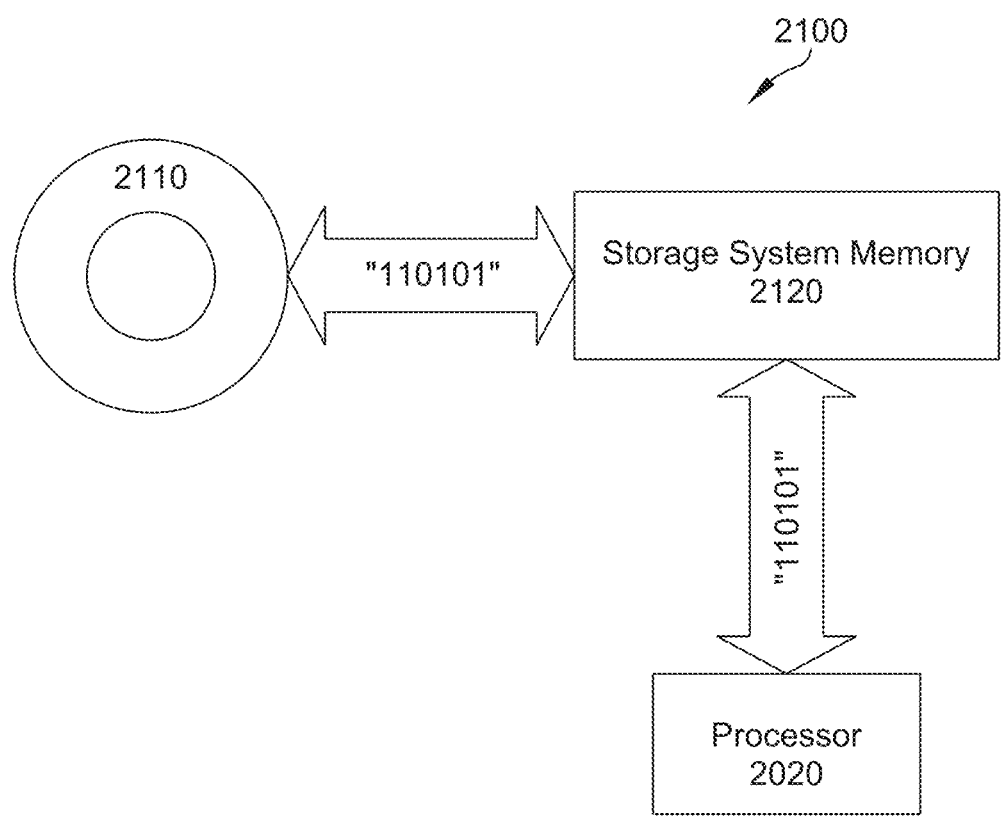
FIG. 21 is a functional block diagram of a general-purpose storage system in accordance with the general-purpose computer system of FIG. 20.

The storage system 2050, shown in greater detail in FIG. 21, typically includes a computer readable and writeable nonvolatile recording medium 2110 in which signals are stored that define a program to be executed by the processor or information stored on or in the medium 2110 to be processed by the program to perform one or more functions associated with embodiments described herein. The medium may, for example, be a disk or flash memory. Typically, in operation, the processor causes data to be read from the nonvolatile recording medium 2110 into another memory 2120 that allows for faster access to the information by the processor than does the medium 2110. This memory 2120 is typically a volatile, random access memory such as a Dynamic Random-Access Memory (DRAM) or Static RAM (SRAM). It may be located in storage system 2100, as shown, or in memory system 2030. The processor 2020 generally manipulates the data within the integrated circuit memory 2030, 2120 and then copies the data to the medium 2110 after processing is completed. A variety of mechanisms are known for managing data movement between the medium 2110 and the integrated circuit memory element 2030, 2120, and the disclosure is not limited thereto. The disclosure is not limited to a particular memory system 2030 or storage system 2050.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 2000 is shown by way of example as one type of computer system upon which various aspects of the disclosure may be practiced, it should be appreciated that aspects of the disclosure are not limited to being implemented on the computer system as shown in FIG. 21. Various aspects of the disclosure may be practiced on one or more computers having a different architecture or components shown in FIG. 21. Further, where functions or processes of embodiments of the disclosure are described herein (or in the claims) as being performed on a processor or controller, such description is intended to include systems that use more than one processor or controller to perform the functions.

Computer system 2000 may be a computer system that is programmable using a high-level computer programming language. Computer system 2000 may be also implemented using specially programmed, special purpose hardware. In computer system 2000, processor 2020 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as JavaScript, SmallTalk, Java, C++, Ada, or C# (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

At least some embodiments of systems and methods described above are generally described for use in IT rooms having equipment racks; however, embodiments of the disclosure may be used with IT rooms without equipment racks and with facilities other than IT rooms. Some embodiments may comprise a number of computers distributed geographically.

In some embodiments, results of analyses are described as being provided in real or near real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements can readily occur to those skilled in the art. Such alterations, modifications, and improvements are intended to be part of this disclosure, and are intended to be within the spirit and scope of the disclosure. Accordingly, the foregoing description and drawings are by way of example only.

What is claimed is:

1. A heat exchange system comprising:
a first heat exchanger subassembly;
a second heat exchanger subassembly;
a first nozzle configured to spray fluid at the first heat exchanger subassembly;
a second nozzle configured to spray fluid at the second heat exchanger subassembly;
at least one fan configured to move air over the first heat exchanger subassembly and the second heat exchanger subassembly;
memory storing controller-executable instructions; and
a controller configured to execute the instructions, which cause the controller to
activate the first nozzle when an outdoor temperature is below a first threshold temperature,
activate the first nozzle and the second nozzle when the outdoor temperature is above the first threshold temperature; and
activate the at least one fan to move air over at least one of the first heat exchanger subassembly and the second heat exchanger subassembly when the outdoor temperature is below a second threshold temperature, the second threshold temperature being below the first threshold temperature,
wherein the at least one fan is positioned proximate to the second heat exchanger subassembly, with air being configured to flow over the second heat exchanger subassembly and then over the first heat exchanger subassembly.

2. The heat exchange system of claim 1, wherein the controller further is configured to deactivate the first nozzle when an outdoor temperature is below the second threshold temperature.

3. A heat exchange system comprising:
a first heat exchanger subassembly;
a second heat exchanger subassembly, the first heat exchanger subassembly being positioned adjacent the second heat exchanger subassembly;
a third heat exchanger subassembly positioned adjacent the first heat exchanger subassembly;
a fourth heat exchanger subassembly positioned adjacent the second heat exchanger subassembly and the third heat exchanger subassembly;
a first nozzle configured to spray fluid at the first heat exchanger subassembly;
a second nozzle configured to spray fluid at the second heat exchanger subassembly, the first nozzle being positioned between the second heat exchanger subassembly and the fourth heat exchanger subassembly and the second nozzle being positioned between the first heat exchanger subassembly and the third heat exchanger subassembly;
at least one fan configured to move air over the second heat exchanger subassembly and the fourth heat exchanger subassembly;
memory storing controller-executable instructions; and
a controller configured to execute the instructions, which cause the controller to
activate the first nozzle when an outdoor temperature is below a threshold temperature, and
activate the first nozzle and the second nozzle when the outdoor temperature is above the threshold temperature.

4. The heat exchange system of claim 3, wherein the threshold temperature is a first threshold temperature, and wherein the controller further is configured to activate the at least one fan to move air over at least one of the second heat exchanger subassembly and the fourth heat exchanger subassembly when the outdoor temperature is below a second threshold temperature, the second threshold temperature being below the first threshold temperature.

5. The heat exchange system of claim 4, wherein the controller further is configured to
deactivate the first nozzle when an outdoor temperature is below the second threshold temperature.

6. The heat exchange system of claim 4, wherein the at least one fan is positioned proximate the second heat exchanger subassembly and the fourth heat exchanger subassembly, with air being configured to flow over the second heat exchanger subassembly and the fourth heat exchanger subassembly and then over the first heat exchanger subassembly and the third heat exchanger subassembly.

* * * * *